(12) United States Patent
Shahana

(10) Patent No.: US 11,884,357 B2
(45) Date of Patent: Jan. 30, 2024

(54) SUSPENSION CONTROL SYSTEM FOR SUSPENSION OF HUMAN-POWERED VEHICLE

(71) Applicant: Shimano Inc., Osaka (JP)

(72) Inventor: Satoshi Shahana, Osaka (JP)

(73) Assignee: Shimano Inc., Osaka (JP)

(*) Notice: Subject to any disclaimer, the term of this patent is extended or adjusted under 35 U.S.C. 154(b) by 441 days.

(21) Appl. No.: 17/129,051

(22) Filed: Dec. 21, 2020

(65) Prior Publication Data

US 2021/0214040 A1    Jul. 15, 2021

(30) Foreign Application Priority Data

Jan. 9, 2020 (DE) .................. 10 2020 100 276.9

(51) Int. Cl.
*B62K 25/04* (2006.01)
*B62K 25/08* (2006.01)
*B62K 25/28* (2006.01)

(52) U.S. Cl.
CPC ............ *B62K 25/08* (2013.01); *B62K 25/286* (2013.01); *B62K 2025/044* (2013.01); *B62K 2025/047* (2013.01)

(58) Field of Classification Search
CPC .............................................. B62K 2025/044
See application file for complete search history.

(56) References Cited

U.S. PATENT DOCUMENTS

| | | | |
|---|---|---|---|
| 8,286,982 B2 | 10/2012 | Plantet et al. | |
| 8,843,273 B2* | 9/2014 | Wesling | B62K 25/286 |
| | | | 280/276 |
| 9,676,441 B2 | 6/2017 | Chen et al. | |
| 10,259,520 B2* | 4/2019 | Butora | B62K 25/08 |
| 2001/0030408 A1* | 10/2001 | Miyoshi | B62K 25/28 |
| | | | 267/141 |
| 2015/0130153 A1* | 5/2015 | Chen | B62K 25/04 |
| | | | 280/124.108 |

* cited by examiner

Primary Examiner — Minnah L Seoh
Assistant Examiner — Hosam Shabara
(74) *Attorney, Agent, or Firm* — Global IP Counselors, LLP

(57) ABSTRACT

A suspension control system is provided for a suspension of a human-powered vehicle. The suspension control system basically includes a detector and an electronic controller. The detector is configured to detect information relating to a running condition of the human-powered vehicle indirectly indicative of a pedaling state of the human-powered vehicle. The electronic controller is configured to output a control signal to adjust an operating state of the suspension in accordance with the information detected by the detector.

15 Claims, 19 Drawing Sheets

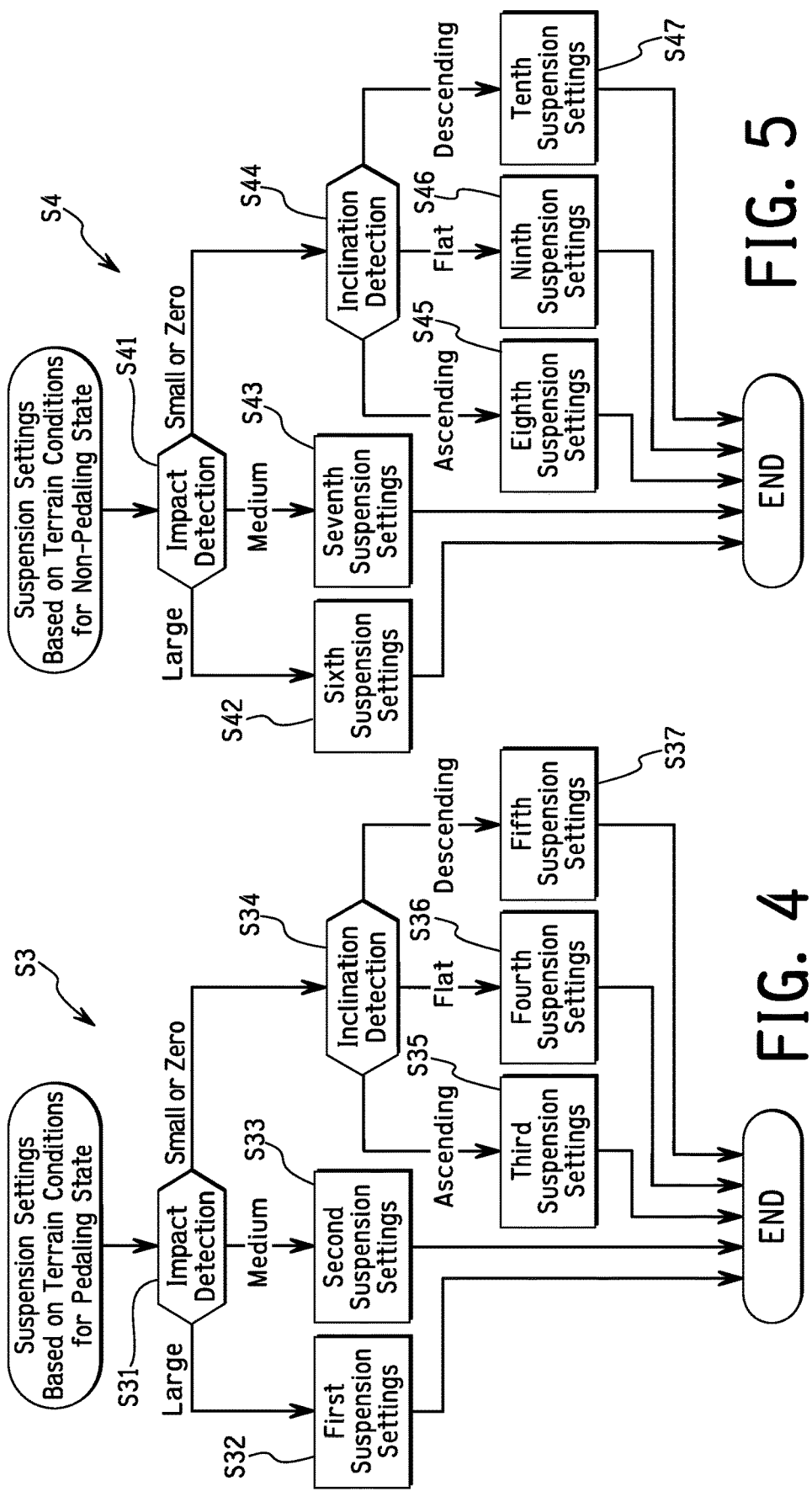

FIG. 6 First Suspension Settings — Set One or More:
Spring Force → Open
Damping → Strong
Stroke → Rear-Long
Front-Long

FIG. 7 Second Suspension Settings — Set One or More:
Spring Force → Medium
Damping → Medium
Stroke → Rear-Long/Mid
Front-Long/Mid

FIG. 8 Third Suspension Settings — Set One or More:
Spring Force → Closed/Mid
Damping → Slow/Mid
Stroke → Rear-Long
Front-Short

FIG. 9 Fourth Suspension Settings — Set One or More:
Spring Force → Closed/Mid
Damping → Slow/Mid
Stroke → Rear-Mid/Long
Front-Mid/Long

FIG. 10 Fifth Suspension Settings — Set One or More:
Spring Force → Closed/Mid
Damping → Slow/Mid
Stroke → Rear-Short
Front-Long

FIG. 11 Sixth Suspension Settings — Set One or More:
Spring Force → Open
Damping → Strong
Stroke → Rear-Long
Front-Long

FIG. 12 Seventh Suspension Settings — Set One or More:
Spring Force → Medium
Damping → Medium
Stroke → Rear-Long/Mid
Front-Long/Mid

FIG. 13 Eighth Suspension Settings — Set One or More:
Spring Force → Closed/Mid
Damping → Slow/Mid
Stroke → Rear-Long
Front-Short

FIG. 14 Ninth Suspension Settings — Set One or More:
Spring Force → Closed/Mid
Damping → Slow/Mid
Stroke → Rear-Mid/Long
Front-Mid/Long

FIG. 15 Tenth Suspension Settings — Set One or More:
Spring Force → Closed/Mid
Damping → Slow/Mid
Stroke → Rear-Short
Front-Long

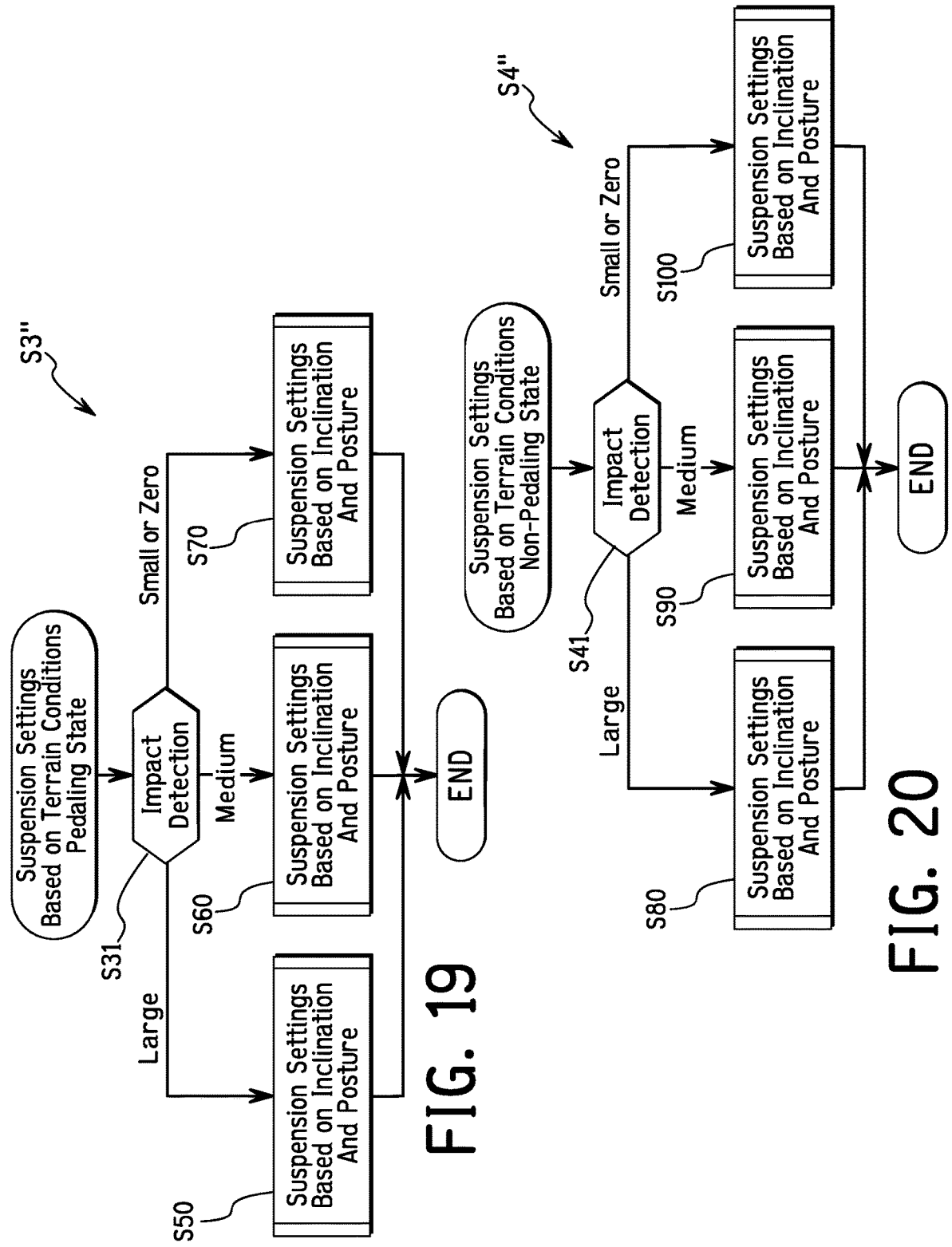

First Sitting Suspension Settings
Set One or More:

Spring Force → Medium/Open
Damping → Medium
Stroke → Rear-Long
        Front-Short/Mid

FIG. 27

First Standing Suspension Settings
Set One or More:

Spring Force → Medium
Damping → Medium/Strong
Stroke → Rear-Long
        Front-Short/Mid

FIG. 28

Second Sitting Suspension Settings
Set One or More:

Spring Force → Medium/Open
Damping → Medium
Stroke → Rear-Long/Mid
        Front-Long/Mid

FIG. 29

Second Standing Suspension Settings
Set One or More:

Spring Force → Medium
Damping → Medium/Strong
Stroke → Rear-Long/Mid
        Front-Long/Mid

FIG. 30

Third Sitting Suspension Settings
Set One or More:

Spring Force → Open/Mid
Damping → Medium
Stroke → Rear-Short/Mid
        Front-Long

FIG. 31

Third Standing Suspension Settings
Set One or More:

Spring Force → Mid
Damping → Medium/Strong
Stroke → Rear-Long/Mid
        Front-Long

FIG. 32

Fourth Sitting Suspension Settings
Set One or More:

Spring Force → Medium
Damping → Medium
Stroke → Rear-Long
        Front-Short

FIG. 33

Fourth Standing Suspension Settings
Set One or More:

Spring Force → Medium
Damping → Medium/Strong
Stroke → Rear-Long
        Front-Short

FIG. 34

Fifth Sitting Suspension Settings
Set One or More:

Spring Force ⟶ Medium
Damping ⟶ Medium
Stroke ⟷ Rear-Long/Mid
Front-Long/Mid

FIG. 35

Fifth Standing Suspension Settings
Set One or More:

Spring Force ⟶ Medium
Damping ⟶ Medium/Strong
Stroke ⟷ Rear-Long/Mid
Front-Long/Mid

FIG. 36

Sixth Sitting Suspension Settings
Set One or More:

Spring Force ⟶ Medium
Damping ⟶ Medium
Stroke ⟷ Rear-Short
Front-Long

FIG. 37

Sixth Standing Suspension Settings
Set One or More:

Spring Force ⟶ Medium
Damping ⟶ Medium/Strong
Stroke ⟷ Rear-Short
Front-Long

FIG. 38

Seventh Sitting Suspension Settings
Set One or More:

Spring Force ⟶ Closed
Damping ⟶ Slow/Mid
Stroke ⟷ Rear-Long
Front-Short

FIG. 39

Seventh Standing Suspension Settings
Set One or More:

Spring Force ⟶ Closed
Damping ⟶ Mid/Strong
Stroke ⟷ Rear-Long
Front-Short

FIG. 40

Eighth Sitting Suspension Settings
Set One or More:

Spring Force ⟶ Closed/Mid
Damping ⟶ Slow/Mid
Stroke ⟷ Rear-Mid/Long
Front-Mid/Long

FIG. 41

Eighth Standing Suspension Settings
Set One or More:

Spring Force ⟶ Closed
Damping ⟶ Strong/Mid
Stroke ⟷ Rear-Mid/Long
Front-Mid/Long

FIG. 42

Ninth Sitting Suspension Settings
Set One or More:

Spring Force → Closed/Mid
Damping → Slow/Mid
Stroke → Rear-Short
　　　　　 Front-Long

FIG. 43

Ninth Standing Suspension Settings
Set One or More:

Spring Force → Closed/Mid
Damping → Strong/Mid
Stroke → Rear-Short
　　　　　 Front-Long

FIG. 44

Tenth Sitting and Standing Suspension Settings
Set One or More:

Spring Force → Medium
Damping → Medium/Strong
Stroke → Rear-Long
　　　　　 Front-Short/Mid

FIG. 45

Eleventh Sitting and Standing Suspension Settings
Set One or More:

Spring Force → Medium
Damping → Medium/Strong
Stroke → Rear-Long/Mid
　　　　　 Front-Long/Mid

FIG. 46

Twelfth Sitting Suspension Settings
Set One or More:

Spring Force → Open/Mid
Damping → Medium
Stroke → Rear-Short/Mid
　　　　　 Front-Long

FIG. 47

Twelfth Standing Suspension Settings
Set One or More:

Spring Force → Open/Mid
Damping → Medium/Strong
Stroke → Rear-Long/Mid
　　　　　 Front-Long

FIG. 48

Thirteenth Sitting and Standing Suspension Settings
Set One or More:

Spring Force → Medium
Damping → Medium
Stroke → Rear-Long
         Front-Short

FIG. 49

Fourteenth Sittingth and Standing Suspension Settings
Set One or More:

Spring Force → Medium
Damping → Medium
Stroke → Rear-Long/Mid
         Front-Long/Mid

FIG. 50

Fifteenth Sitting and Standing Suspension Settings
Set One or More:

Spring Force → Medium
Damping → Medium
Stroke → Rear-Short
         Front-Long

FIG. 51

Sixteen Sittingth and Standing Suspension Settings
Set One or More:

Spring Force → Closed/Mid
Damping → Slow/Mid
Stroke → Rear-Long
         Front-Short

FIG. 52

Seventeenth Sitting and Standing Suspension Settings
Set One or More:

Spring Force → Closed/Mid
Damping → Slow/Mid
Stroke → Rear-Mid/Long
         Front-Mid/Long

FIG. 53

Eighteenth Sitting and Standing Suspension Settings
Set One or More:

Spring Force → Closed/Mid
Damping → Slow/Mid
Stroke → Rear-Short
         Front-Long

FIG. 54

SUSPENSION CONTROL SYSTEM FOR SUSPENSION OF HUMAN-POWERED VEHICLE

CROSS-REFERENCE TO RELATED APPLICATIONS

This application claims priority to German Patent Application No. 102020100276.9, filed on Jan. 9, 2020. The entire disclosure of German Patent Application No. 102020100276.9 is hereby incorporated herein by reference.

BACKGROUND

Technical Field

This disclosure generally relates to a suspension control system for a suspension of a human-powered vehicle.

Background Information

Some human-powered vehicles, in particular bicycles, have been provided with one or more suspensions to absorb the shock that would have been transmitted to the rider when riding on rough surfaces. In recent years, suspension control devices have been proposed to control a state of the suspension(s) based on a running condition of the human-powered vehicle. For example, U.S. Pat. Nos. 8,286,982 and 9,676,441 both discloses adjusting an operating state of a suspension based at least partially on a pedaling signal from a pedaling cadence sensor.

SUMMARY

Generally, the present disclosure is directed to various features of a suspension control system for a suspension of a human-powered vehicle. It has been discovered that detecting a pedaling state or a non-pedaling by directly detecting the movement of a part of a crank assembly (e.g., using a pedaling cadence sensor) can result in an inaccurate determination of the need to adjust the suspension of the human-powered vehicle. Namely, some riders may pedal in case which pedaling is not really needed for the current running condition. In such a case, the suspension may be incorrectly adjusted for the current running condition because it is incorrectly determined that the pedaling is required under the current running condition.

In one feature, a suspension control system is provided in which an operating state of a suspension of a human-powered vehicle is adjusted based on either an indirect detection of a pedaling state or a fluctuation of a running condition of the human-powered vehicle in a predetermined time interval.

In view of the state of the known technology and in accordance with a first aspect of the present disclosure, a suspension control system is provided for a suspension of a human-powered vehicle, the suspension control system basically comprises a detector and an electronic controller. The detector is configured to detect information relating to a running condition of the human-powered vehicle indirectly indicative of a pedaling state of the human-powered vehicle. The electronic controller is configured to output a control signal to adjust an operating state of the suspension in accordance with the information detected by the detector.

With the suspension control system according to the first aspect, it is possible to more appropriately adjust an operating state of the suspension without directly detecting a pedaling state (e.g., without using a cadence sensor to detect a pedaling state) to adjust the operating state of the suspension.

In accordance with a second aspect of the present disclosure, a suspension control system is provided for a suspension of a human-powered vehicle, the suspension control system basically comprises a fluctuation detector and an electronic controller. The fluctuation detector is configured to detect information relating to a fluctuation in a running condition of the human-powered vehicle in a predetermined time interval. The electronic controller is configured to output a control signal to adjust an operating state of the suspension in accordance with the information detected by the fluctuation detector.

With the suspension control system according to the second aspect, it is possible to more appropriately adjust an operating state of the suspension based on a fluctuation in a running condition of the human-powered vehicle without directly detecting a pedaling state (e.g., without using a cadence sensor to detect a pedaling state) to adjust the operating state of the suspension.

In accordance with a third aspect of the present disclosure, the suspension control system according to the second aspect further comprises a detector configured to detect information relating to the running condition of the human-powered vehicle indirectly indicative of a pedaling state of the human-powered vehicle. The electronic controller is further configured to output the control signal to adjust the operating state of the suspension in accordance with the information detected by the detector.

With the suspension control system according to the third aspect, it is possible to output a control signal to adjust the operating state of the suspension in accordance with the information detected by the detector.

In accordance with a fourth aspect of the present disclosure, the suspension control system according to the second or third aspect is configured so that the fluctuation relates to at least one of a tire air pressure, a vehicle acceleration, a handlebar load, a saddle load, an assist power output, a rider's movement, a chain state change and a precise speed.

With the suspension control system according to the fourth aspect, it is possible to more appropriately adjust the operating state of the suspension based on at least one of a tire air pressure, a vehicle acceleration, a handlebar load, a saddle load, an assist power output, a rider's movement, a chain state change and a precise speed.

In accordance with a fifth aspect of the present disclosure, the suspension control system according to any one of the first to fourth aspects is configured so that the control signal includes at least a first suspension control signal to set the suspension to a first operating state, a second suspension control signal to set the suspension to a second operating state different from the first operating state, and a third suspension control signal to set the suspension to a third operating state different from the first operating state and the second operating state. The electronic controller is further configured to output at least one of the first suspension control signal, the second suspension control signal and the third suspension control signal to adjust the operating state of the suspension.

With the suspension control system according to the fifth aspect, it is possible to control the operating state of the suspension differently using different control signals.

In accordance with a sixth aspect of the present disclosure, the suspension control system according to the fifth aspect is configured so that the operating state of the suspension relates to at least one of a suspension stroke, a spring preload, a damping, and a lockout.

With the suspension control system according to the sixth aspect, it is possible to adjust different operating state of the suspension such as at least one of a suspension stroke, a spring preload, a damping, and a lockout.

In accordance with a seventh aspect of the present disclosure, the suspension control system according to any one of the first to sixth aspects further comprises an additional detector configured to detect additional information relating to at least one of a riding posture of rider riding the human-powered vehicle and a terrain condition. The electronic controller is further configured to output the control signal to adjust the operating state of the suspension in accordance with the information in combination with the additional information.

With the suspension control system according to the seventh aspect, it is possible to even more appropriately adjust the operating state of the suspension based on additional information relating to at least one of a riding posture of rider riding the human-powered vehicle and a terrain condition.

In accordance with an eighth aspect of the present disclosure, the suspension control system according to the seventh aspect is configured so that the riding posture includes at least one of a sitting posture and a standing posture.

With the suspension control system according to the eighth aspect, it is possible to even more appropriately adjust the operating state of the suspension based on the riding posture of rider riding the human-powered vehicle.

In accordance with a ninth aspect of the present disclosure, the suspension control system according to the seventh or eighth aspect is configured so that the electronic controller is configured to adjust a damping value in accordance with the additional information relating to the terrain condition.

With the suspension control system according to the ninth aspect, it is possible to even more appropriately adjust the operating state of the suspension based on the terrain condition on which the human-powered vehicle is traveling.

In accordance with a tenth aspect of the present disclosure, the suspension control system according to any one of the first to ninth aspects is configured so that the control signal includes at least one of a front suspension adjustment signal and a rear suspension adjustment signal.

With the suspension control system according to the tenth aspect, it is possible to adjust the operating state at least one of a front suspension and a rear suspension of the human-powered vehicle.

In accordance with an eleventh aspect of the present disclosure, a bicycle comprises the suspension control system according to any one of the first to tenth aspects, and the bicycle further comprises a bicycle frame, a front wheel, a rear wheel and at least one of a front suspension and a rear suspension. The front wheel is coupled to the bicycle frame. The rear wheel is coupled to the bicycle frame. The front suspension is provided between the bicycle frame and the front wheel. The rear suspension is provided between the bicycle frame and the rear wheel.

With the suspension control system according to the eleventh aspect, it is possible to effectively use the suspension control system to adjust a bicycle suspension.

Also, other objects, features, aspects and advantages of the disclosed suspension control system will become apparent to those skilled in the art from the following detailed description, which, taken in conjunction with the annexed drawings, discloses preferred embodiments of the suspension control system.

BRIEF DESCRIPTION OF THE DRAWINGS

Referring now to the attached drawings which form a part of this original disclosure:

FIG. 4 is a flowchart of a subroutine of the automatic suspension control of FIG. 3 that is executed by the electronic controller of the suspension control system upon determining a pedaling state exists;

FIG. 5 is a flowchart of a subroutine of the automatic suspension control of FIG. 3 that is executed by the electronic controller of the suspension control system upon determining a non-pedaling state exists;

FIG. 6 is a prestored control of first suspension settings illustrated as a control table that is executed the electronic controller of the suspension control system in carrying out the automatic suspension control of FIGS. 3 and 4 for adjusting the operating state of at least one of the front suspension and the rear suspension of the human-powered vehicle of FIG. 1;

FIG. 7 is a prestored control of second suspension settings illustrated as a control table that is executed the electronic controller of the suspension control system in carrying out the automatic suspension control of FIGS. 3 and 4 for adjusting the operating state of at least one of the front suspension and the rear suspension of the human-powered vehicle of FIG. 1;

FIG. 8 is a prestored control of third suspension settings illustrated as a control table that is executed the electronic controller of the suspension control system in carrying out the automatic suspension control of FIGS. 3 and 4 for adjusting the operating state of at least one of the front suspension and the rear suspension of the human-powered vehicle of FIG. 1;

FIG. 9 is a prestored control of fourth suspension settings illustrated as a control table that is executed the electronic controller of the suspension control system in carrying out the automatic suspension control of FIGS. 3 and 4 for adjusting the operating state of at least one of the front suspension and the rear suspension of the human-powered vehicle of FIG. 1;

FIG. 10 is a prestored control of fifth suspension settings illustrated as a control table that is executed the electronic controller of the suspension control system in carrying out the automatic suspension control of FIGS. 3 and 4 for adjusting the operating state of at least one of the front suspension and the rear suspension of the human-powered vehicle of FIG. 1;

FIG. 11 is a prestored control of sixth suspension settings illustrated as a control table that is executed the electronic controller of the suspension control system in carrying out the automatic suspension control of FIGS. 3 and 5 for adjusting the operating state of at least one of the front suspension and the rear suspension of the human-powered vehicle of FIG. 1;

FIG. 12 is a prestored control of seventh suspension settings illustrated as a control table that is executed the electronic controller of the suspension control system in carrying out the automatic suspension control of FIGS. 3 and 5 for adjusting the operating state of at least one of the front suspension and the rear suspension of the human-powered vehicle of FIG. 1;

FIG. 13 is a prestored control of eighth suspension settings illustrated as a control table that is executed the electronic controller of the suspension control system in carrying out the automatic suspension control of FIGS. 3 and 5 for adjusting the operating state of at least one of the front suspension and the rear suspension of the human-powered vehicle of FIG. 1;

FIG. 14 is a prestored control of ninth suspension settings illustrated as a control table that is executed the electronic controller of the suspension control system in carrying out the automatic suspension control of FIGS. 3 and 5 for adjusting the operating state of at least one of the front suspension and the rear suspension of the human-powered vehicle of FIG. 1;

FIG. 15 is a prestored control of tenth suspension settings illustrated as a control table that is executed the electronic controller of the suspension control system in carrying out the automatic suspension control of FIGS. 3 and 5 for adjusting the operating state of at least one of the front suspension and the rear suspension of the human-powered vehicle of FIG. 1;

FIG. 19 is a flowchart of another alternative subroutine of the automatic suspension control of FIG. 3 that is executed by the electronic controller of the suspension control system upon determining a pedaling state exists;

FIG. 20 is a flowchart of an alternative subroutine of the automatic suspension control of FIG. 3 that is executed by the electronic controller of the suspension control system upon determining a non-pedaling state exists;

FIG. 27 is a prestored control of first sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 28 is a prestored control of first standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 29 is a prestored control of second sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 30 is a prestored control of second standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 31 is a prestored control of third sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 32 is a prestored control of third standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 33 is a prestored control of fourth sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 34 is a prestored control of fourth standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 35 is a prestored control of fifth sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 36 is a prestored control of fifth standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 37 is a prestored control of sixth sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 38 is a prestored control of sixth standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 39 is a prestored control of seventh sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 40 is a prestored control of seventh standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 41 is a prestored control of eighth sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 42 is a prestored control of eighth standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 43 is a prestored control of ninth sitting suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 44 is a prestored control of ninth standing suspension settings illustrated as a control table that is executed the electronic controller of the suspension control system in carrying out the automatic suspension control of FIGS. 3 and 19 for adjusting the operating state of at least one of the front suspension and the rear suspension of the human-powered vehicle of FIG. 1;

FIG. 45 is a prestored control of tenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 46 is a prestored control of eleventh sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 47 is a prestored control of twelfth sitting suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 48 is a prestored control of twelfth standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 49 is a prestored control of thirteenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 50 is a prestored control of fourteenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 51 is a prestored control of fifteenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 52 is a prestored control of sixteenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1;

FIG. 53 is a prestored control of seventeenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1; and FIG. 54 is a prestored control of eighteenth sitting and standing suspension settings illustrated as a control table that is executed the electronic controller of the suspension control system in carrying out the automatic suspension control of FIGS. 3 and 20 for adjusting the operating state of at least one of the front suspension and the rear suspension of the human-powered vehicle of FIG. 1.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
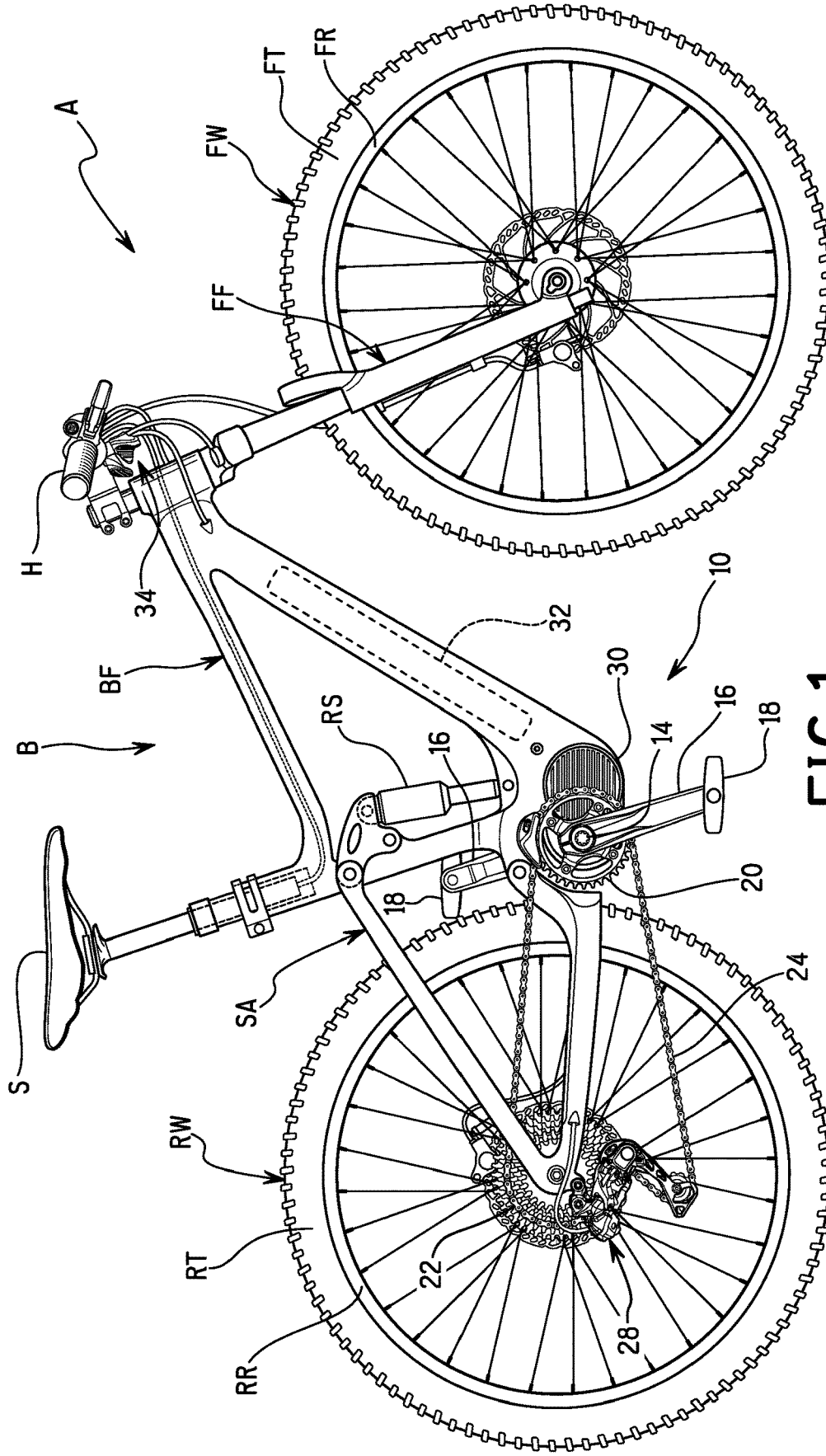
FIG. 1 is a side elevational view of a human-powered vehicle (e.g., a bicycle) having a front suspension and a rear suspension that are controlled by a suspension control system in accordance with one embodiment.

Referring initially to FIG. 1, a human-powered vehicle A that is equipped with a suspension control system in accordance with one illustrated embodiment. The term "human-powered vehicle" refers to a vehicle that at least partially uses human force as a prime mover for traveling and includes a vehicle that assists human force with electric power. The human-powered vehicle does not include a vehicle using only a prime mover that is not human force. In particular, the human-powered vehicle does not include a vehicle that only uses an internal combustion engine or only uses an electric motor as the prime mover. The human-powered vehicle is a compact light vehicle that in some countries does not require a license for driving on a public road. Here, the human-powered vehicle A is illustrated as a bicycle. However, human-powered vehicle A is not limited to the illustrated bicycle. For example, the human-powered vehicle can include, for example, various types of bicycles such as a mountain bike, a road bike, a city bike, a cargo bike, and a recumbent bike and an electric assist bicycle (E-bike).

Basically, as seen in FIG. 1, the human-powered vehicle A (e.g., a bicycle) has a vehicle body B that includes a bicycle frame BF, a front fork FF and a swing arm SA. The front fork FF is pivotally supported by the bicycle frame BF to pivot about an inclined vertical axle in the front portion of the bicycle frame BF. The front fork FF rotatably supports a front wheel FW at the lower end of the front fork FF. The front fork FF is a front suspension fork that constitutes a front suspension of the human-powered vehicle A. The front wheel FW includes a front rim FR and a front tire FT. The front rim FR is attached to a front hub by a plurality of spokes in a conventional manner. A rear wheel RW is rotatably mounted to a rear end of the swing arm SA. A rear shock absorber RS is operatively coupled between the swing arm SA and the bicycle frame BF. The rear shock absorber RS and the swing arm SA constitutes a rear suspension of the human-powered vehicle A. The rear wheel RW includes a rear rim RR and a front tire RT. The rear rim RR is attached to a rear hub by a plurality of spokes in a conventional manner. The vehicle body B further comprises a handlebar H that is coupled to the front fork FF, and a saddle or seat S that is coupled to the bicycle frame BF. The handlebar H is attached to the front fork FF for steering the front wheel FW. The bicycle seat S is mounted on top of an electric adjustable seatpost SP that is mounted to the bicycle frame BF in a conventional manner. Thus, in the illustrated embodiment, the human-powered vehicle A is a bicycle that comprises the bicycle frame BF, the front wheel FW, the rear wheel RW and at least one of a front suspension (the front fork FF) and a rear suspension (the rear shock absorber RS and the swing arm SA). The front wheel FW is coupled to the bicycle frame BF. The rear wheel RW is coupled to the bicycle frame BF. The front suspension (the front fork FF) is provided between the bicycle frame BF and the front wheel FW. The rear suspension (the rear shock absorber RS and the swing arm SA) is provided between the bicycle frame BF and the rear wheel RW.

The human-powered vehicle A further includes a drivetrain 10 for driving the rear wheel RW. The drivetrain 10 includes a crankshaft 14 rotatable relative to the bicycle frame BF and a pair of crank arms 16. The crank arms 16 are respectively provided on two axial ends of the crankshaft 14. A pedal 18 is connected to each of the crank arms 16. The drivetrain 10 further includes a front sprocket 20 attached to one of the crank arms 16 and a plurality of rear sprockets 22 attached to a hub of the rear wheel RW. A chain 24 transfers a rotational force of the front sprocket 20 to the rear sprockets 22 in a conventional manner. An electric rear derailleur 28 is provided on the swing arm SA of the human-powered vehicle A for shifting the chain 24 between the rear sprockets 22 in a conventional manner. The electric rear derailleur 28 is an example of a transmission device.

Here, the drivetrain 10 further includes an electric assist motor 30 that assists in the propulsion of the human-powered vehicle A. The electric assist motor 30 is operative coupled to the front sprocket 20 in a conventional manner to selectively input a motor drive force from the electric assist motor 30 to the front sprocket 20. A battery 32 is provided inside the bicycle frame BF for supply electrical power to electric components of the human-powered vehicle A including the front fork FF, the rear shock absorber RS, the electric adjustable seatpost SP, the electric rear derailleur 28 and the electric assist motor 30. The human-powered vehicle A includes various user operable input devices 34 to physically (manually) adjust, control or set the front fork FF, the rear shock absorber RS, the electric adjustable seatpost SP, the electric rear derailleur 28 and the electric assist motor 30. The user operable input devices 34 can include, for example, a button, a switch, a lever, a dial and/or a touch screen.

Figure 2:
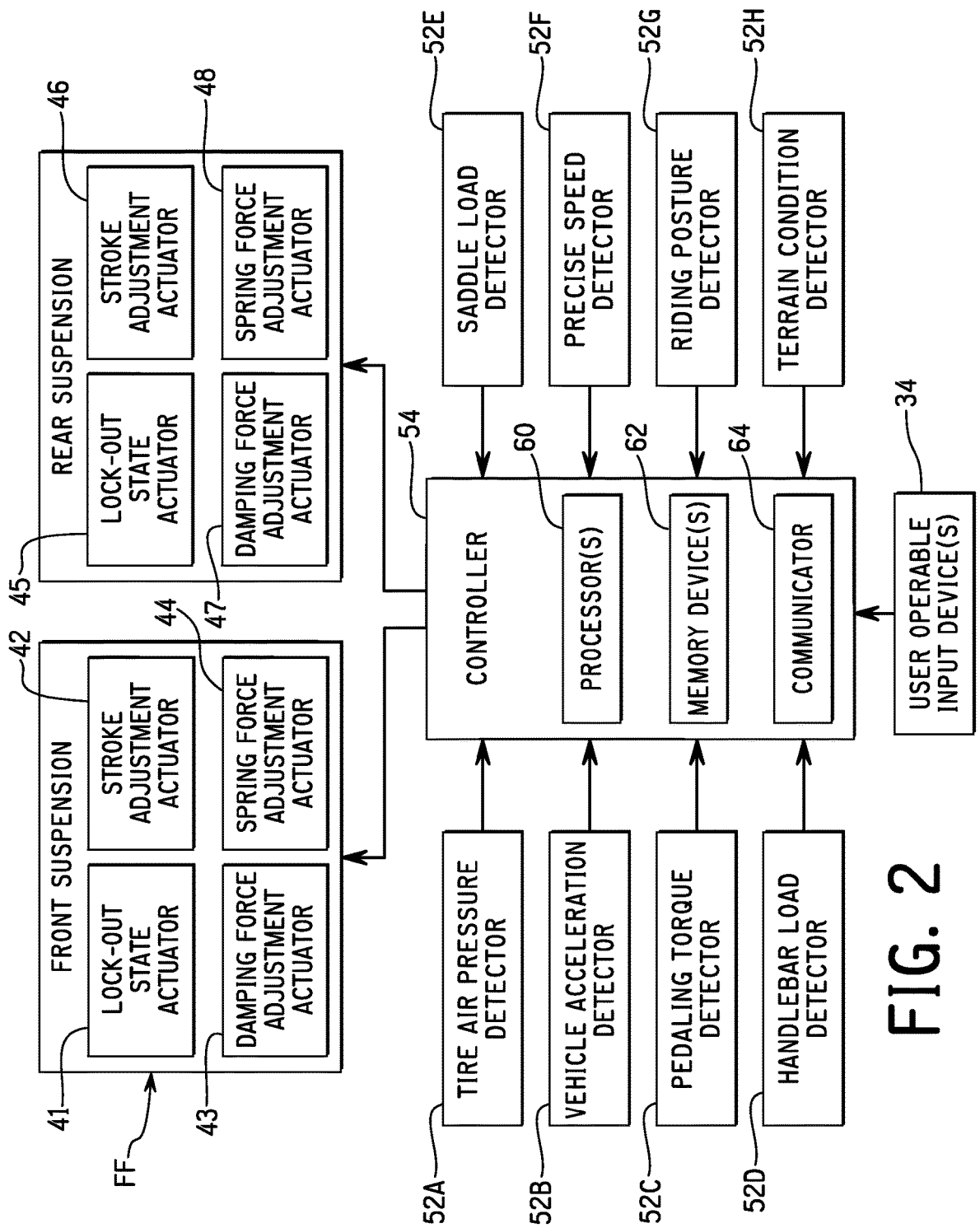
FIG. 2 is a block diagram illustrating the suspension control system for adjusting the front suspension and the rear suspension of the human-powered vehicle of FIG. 1.

Referring now to FIG. 2, the front suspension (the front fork FF) of the human-powered vehicle A includes a lock-out state actuator 41, a stroke adjustment actuator 42, a damping force adjustment actuator 43 and a spring force adjustment actuator 44. The lock-out state actuator 41 is configured to adjust a valve in the front fork FF between a closed position, a partially open position and a fully opened position. The stroke adjustment actuator 42 is configured to adjust a length of stroke of the front fork FF between at least a long stroke position and a short stroke position. The damping force adjustment actuator 43 is configured to adjust a damping force of the front fork FF between at least a slow damping force, a medium damping force and a strong damping force. The spring force adjustment actuator 44 is configured to adjust a spring force of the front fork FF between at least a low spring force, a medium spring force and a strong spring force. Since adjustable front fork are well known in the human-powered vehicle field, the details of the front fork FF will not be discussed and/or illustrated herein for the sake of brevity.

Similarly, the rear suspension (the rear shock absorber RS and the swing arm SA) of the human-powered vehicle A includes a lock-out state actuator 45, a stroke adjustment actuator 46, a damping force adjustment actuator 47 and a spring force adjustment actuator 48. Here, the actuators 41 to 48 are electrically controlled actuators that receive electrical power from the battery 32. The lock-out state actuator 45 is configured to adjust a valve in the rear shock absorber RS between a closed position, a partially open position and a fully opened position. The stroke adjustment actuator 46 is configured to adjust a length of stroke of the rear shock absorber RS between at least a long stroke position and a short stroke position. The damping force adjustment actuator 47 is configured to adjust a damping force of the rear shock absorber RS between at least a slow damping force, a medium damping force and a strong damping force. The spring force adjustment actuator 48 is configured to adjust a spring force of the rear shock absorber RS between at least a low spring force, a medium spring force and a strong spring force. Since adjustable rear shock absorbers are well known in the human-powered vehicle field, the details of the rear shock absorber RS will not be discussed and/or illustrated herein for the sake of brevity.

As seen in FIG. 2, a suspension control system 50 is illustrated for a suspension (e.g., the rear shock absorber RS and the swing arm SA or the front fork FF) of the human-powered vehicle A. Thus, in the illustrated embodiment, the human-powered vehicle A is a bicycle that comprises the suspension control system 50. Basically, in the illustrated embodiment, the suspension control system 50 is configured to adjust an operating state of one or both of the rear shock absorber RS or the front fork FF without using a cadence sensor or any other detector that directly detects pedaling of the crank arms 16. In other words, the suspension control system 50 is configured to adjust an operating state of one or both of the rear shock absorber RS or the front fork FF by detecting at least one of a condition indicative of pedaling state but without actually detecting the movement of the crankshaft 14, the crank arms 16 and/or the front sprocket 20. As explained below, the suspension control system 50 uses at least one of a tire air pressure, a forward acceleration, a load on the handlebar/cockpit, a saddle load on the saddle S, an assist power output, a rider's movement (visual), a changing state of the chain 24, and a high performance/ precise speed sensor as parameter to identify the pedaling state efficiently. In this way, it may be possible to have less noise or false alarms in that for example some rider still pedaling in cases in which pedaling is not really needed.

The suspension control system 50 basically comprises at least one detector 52 and a controller 54. The detector 52 is configured to detect information relating to a running condition of the human-powered vehicle A indirectly indicative of a pedaling state of the human-powered vehicle A. The controller 54 is configured to output a control signal to adjust an operating state of the suspension (e.g., the rear shock absorber RS and the swing arm SA or the front fork FF) in accordance with the information detected by the detector 52. Here, as seen in FIG. 2, the suspension control system 50 includes several indirect pedaling detectors such as a tire air pressure detector 52A, a vehicle acceleration detector 52B, a pedaling torque detector 52C, a handlebar load detector 52D, a saddle load detector 52E, a precise speed detector 52F, a riding posture detector 52G and a terrain condition detector 52H. These detectors 52A to 52H can be collectively referred to as the detector 52 since the suspension control system 50 can use one or more of the detectors 52A to 52H in adjusting an operating state of a suspension (e.g., the rear shock absorber RS and the swing arm or the front fork FF). These detectors 52A to 52H can be collectively referred to as the detector 52 since the suspension control system 50 can use one or more of the detectors 52A to 52H in adjusting an operating state of a suspension (e.g., the rear shock absorber RS and the swing arm or the front fork FF).

The tire air pressure detector 52A can be, for example, a tire air pressure sensor that is available on the market or can be a custom tire air pressure sensor. The tire air pressure detector 52A can be for example, air pressure sensors that are attached to an air valve of the front and rear tires FT and RT. In any case, the tire air pressure detector is configured to detect changes in the air pressure of the front and rear tires FT and RT and to detect pressure that acts on the front and rear tires FT and RT. The tire air pressure detector 52A wirelessly communicates with the controller 54. The controller 54 can, for example, classify the tire air pressure as one of small, medium and large.

The vehicle acceleration detector 52B can be, for example, a vertical acceleration sensor, a lateral acceleration sensor or a forward acceleration sensor, which are available on the market or can be a custom acceleration sensor. The vehicle acceleration detector 52B is configured detect changes in acceleration of the human-powered vehicle A. The vehicle acceleration detector 52B wirelessly communicates with the controller 54, or can communicate with the controller 54 via a communication wire (e.g., a dedicated signal line or via a power line using power line communication. The controller 54 can, for example, classify the acceleration as one of small, medium and large.

The pedaling torque detector 52C can be, for example, a force sensor, which are available on the market or can be a custom a force sensor. The pedaling torque detector 52C is configured detect changes in force applied to a part of the drivetrain 10 of the human-powered vehicle A. The pedaling torque detector 52C wirelessly communicates with the controller 54, or can communicate with the controller 54 via a communication wire (e.g., a dedicated signal line or via a power line using power line communication. The controller 54 can, for example, classify the pedaling torque as one of small, medium and large.

The handlebar load detector 52D can be, for example, a force sensor, a strain sensor, a vibration sensor, or a pressure sensor, which are available on the market or can be a custom handlebar load sensor for detecting a gripping state or handlebar load on the handlebar H. In any case, the handlebar load detector 52D is configured detect to detect a force/load/pressure on the handlebar H. The handlebar load detector 52D wirelessly communicates with the controller 54, or can communicate with the controller 54 via a communication wire (e.g., a dedicated signal line or via a power line using power line communication. The controller 54 can, for example, classify the gripping state or the handlebar load as one of small, medium and large.

The saddle load detector 52E can be, for example, a force sensor, a strain sensor, a vibration sensor, or a pressure sensor (including an air pressure sensor or a hydraulic pressure sensor which used to sense a pressure in air or hydraulic fluid of the seatpost SP), which are available on the market or can be a custom saddle load sensor for detecting a rider sitting on the saddle S. In any case, the saddle load detector 52E is configured to detect a force/load/ pressure on the saddle S. The saddle load detector 52E wirelessly communicates with the controller 54, or can communicate with the controller 54 via a communication wire (e.g., a dedicated signal line or via a power line using power line communication. The controller 54 can, for example, classify the saddle load as one of small, medium and large.

The precise speed detector 52F can be, for example, a magnetic reed switch or a Hall element that detects a magnet for detecting a rotational speed of rotating part of the human-powered vehicle A that is indicative of a speed of the human-powered vehicle A. The precise speed detector 52F can be a magnetic reed switch or a Hall element that is provided on the front fork FF and configured to detect a magnet attached to the front wheel, for example. The precise speed detector 52F is configured detect changes in the speed of the human-powered vehicle A. The precise speed detector 52F wirelessly communicates with the controller 54, or can communicate with the controller 54 via a communication wire (e.g., a dedicated signal line or via a power line using power line communication. The controller 54 can, for example, classify the speed as one of small, medium and large.

The riding posture detector 52G can be, for example, one or more pressure sensors and/or strain gauges disposed on one of the saddle S, the saddle post SP, the grips of the handlebar H, the handlebar stem of the handlebar H, the pedals 18, the frame BF, the front fork FF, the rear shock absorber RS, etc., so as to obtain sensing data for judging a pedaling posture of the rider. The pressure sensor can be disposed inside the saddle S or the saddle post SP to serve as the riding posture detector 52G. When the riding posture detector 52G senses that a force is applied, the pedaling posture is the sitting posture, when the riding posture detector 52G does not senses a force being applied, the pedaling posture is the standing posture. Alternatively, the pressure sensor can be disposed at each of the pedals 18, the grips of the handlebar H to serve as the riding posture detector 52G. However, the posture sensor is not limited thereto. The riding posture detector 52G can also be an optical sensor, a radar, or other suitable sensors capable of sensing the change of center of gravity and posture of the rider. The riding posture detector 52G is configured detect changes in a riding posture of a rider of the human-powered vehicle A. The riding posture detector 52G wirelessly communicates with the controller 54, or can communicate with the controller 54 via a communication wire (e.g., a dedicated signal line or via a power line using power line communication. Thus, the riding posture detector 52G is configured to detect a posture of a rider when riding the human-powered vehicle A and output a posture signal to the controller 54. The controller 54 can, for example, classify the riding posture as one of sitting or standing.

The terrain condition detector 52H can be, for example, an accelerometer, a video camera or other image capturing device, which are available on the market or can be a custom accelerometer, or a custom image capturing device. The tire air pressure detector 52A and/or vehicle acceleration detector 52B can be used as the terrain condition detector so as to eliminate the need for a separate terrain condition detector. The terrain condition detector 52H is configured detect changes in a terrain condition of the human-powered vehicle A. The terrain condition detector 52H wirelessly communicates with the controller 54, or can communicate with the controller 54 via a communication wire (e.g., a dedicated signal line or via a power line using power line communication. The controller 54 can, for example, classify the terrain condition as one of small, medium and large.

The detectors 52A to 52H can communicate with the controller 54 via wired communications and/or wireless communications. Thus, for example, based output data or information from the detectors 52A to 52H, the control signal includes at least a first suspension control signal to set the suspension to a first operating state, a second suspension control signal to set the suspension to a second operating state different from the first operating state, and a third suspension control signal to set the suspension to a third operating state different from the first operating state and the second operating state. Thus, the controller 54 is configured to output at least one of the first suspension control signal, the second suspension control signal and the third suspension control signal to adjust the operating state of the suspension. The first, second and third operating states can be preset in the controller 52 by the manufacturer and can be adjusted by the user using one of the user operable input devices 34 or a mobile device (e.g., a tablet, a mobile phone, etc.) as needed and/or desired. In each of the first, second and third operating states, the operating state of the suspension (e.g., the rear shock absorber RS and the swing arm or the front fork FF) relates to at least one of a suspension stroke, a spring preload, a damping and a lockout. The controller 52 is configured to the rear suspension (e.g., the rear shock absorber RS and the swing arm) and/or the front suspension (e.g., the front fork FF). Thus, the control signal includes at least one of a front suspension adjustment signal and a rear suspension adjustment signal.

In one preferred configuration the suspension control system 50 comprises a fluctuation detector. One or more of the detectors 52A to 52H can be the fluctuation detector as needed and/or desired. The fluctuation detector is an indirect pedaling state detector such as one or more of the detectors 52A to 52H mentioned above. In any case, the fluctuation detector is configured to detect information relating to a fluctuation in a running condition of the human-powered vehicle A in a predetermined time interval. The controller 54 is configured to output a control signal to adjust an operating state of the suspension (e.g., the rear shock absorber RS and the swing arm SA or the front fork FF) in accordance with the information detected by the fluctuation detector. In carrying out the adjustment of an operating state of the suspension (e.g., the rear shock absorber RS and the swing arm or the front fork FF), as explained below, the fluctuation relates to at least one of a tire air pressure, a vehicle acceleration, a handlebar load, a saddle load, an assist power output, a rider's movement, a chain state change and a precise speed.

In the suspension control system 50, the controller 54 continuously receives information or data from the detectors 52A to 52H at prescribed transmission rates. The information or data from the detectors 52A to 52H is used by the controller 54 such that one or more of the detectors 52A to 52H can be the fluctuation detector and one or more of the detectors 52A to 52H can be merely an indirect pedaling state detector as needed and/or desired. In other words, information or data from some of the detectors 52A to 52H can be analyzed by the controller 54 to detect a fluctuation in a running condition of the human-powered vehicle A in a predetermined time interval (a variation frequency of at least one running condition of an indirect pedaling state over a predetermined time interval), or can be analyzed by the controller 54 to detect a current state of in a running condition of an indirect pedaling state at a point in time (e.g., a single data point or an average of several data points for predetermined period of time). Thus, in addition to the fluctuation detector, the suspension control system 50 further comprises a detector configured to detect information relating to the running condition of the human-powered vehicle A indirectly indicative of a pedaling state of the human-powered vehicle A. Accordingly, in addition to adjusting the operating state of the suspension (e.g., the rear shock absorber RS and/or the swing arm SA or the front fork FF) in accordance with the information detected by the fluctuation detector, the controller 54 is further configured to output the control signal to adjust the operating state of the suspension (e.g., the rear shock absorber RS and/or the swing arm SA or the front fork FF) in accordance with the information detected by the detector.

As mentioned above, it will be understood from this disclosure that not all of the detectors 52A to 52H need to be used for adjusting the operating state of a suspension. In one preferred configuration, in addition to the fluctuation detector and/or one indirect pedaling state detector that detects the indirect pedaling state at a point in time, the suspension control system 50 further comprises an additional detector configured to detect additional information relating to at least one of a riding posture of rider riding the human-powered vehicle A and a terrain condition. In this case, the controller 54 is configured to output the control signal to adjust the operating state of the suspension (e.g., the rear shock absorber RS and/or the swing arm SA or the front fork FF) in accordance with the information of the fluctuation detector and/or one indirect pedaling state detector in combination with the additional information.

In the case of the additional detector is configured to detect the riding posture of a rider, then the handlebar load detector 52D and/or the saddle load detector 52E can be used to detect the riding posture of a rider. Basically, the riding posture includes at least one of a sitting posture and a standing posture. In the case of the additional detector is configured to detect the terrain condition then the terrain condition detector 52H can be used to detect the terrain condition on which the human-powered vehicle A is traveling. Preferably, the controller 54 is configured to adjust a damping value in accordance with the additional information relating to the terrain condition. This damping value can refer to a general operating state of suspension, which also includes one or more of a suspension stroke, a spring reload, a lockout state and any other than damping characteristic that can be adjusted.

Furthermore, the indirect pedaling state detectors of the human-powered vehicle A are not limited to those shown in FIG. 2. For example, other indirect pedaling state detectors include a chain tension sensor that detects a strain/force/load on the chain 24.

Here, in the illustrated embodiment, the controller 54 is an electronic controller that is preferably a microcomputer that includes at least one processor 60 (i.e., a central processing unit) and at least one memory device 62 (i.e., a computer storage device). The controller 54 is formed of one or more semiconductor chips that are mounted on one or more circuit boards. The terms "electronic controller" or "controller" as used herein refers to hardware that executes a software program, and does not include a human. The processor 60 can be one or more integrated circuits having firmware for causing the circuitry to complete the activities described herein. The memory device 62 is any computer storage device or any non-transitory computer-readable medium with the sole exception of a transitory, propagating signal. For example, the memory device 62 can include nonvolatile memory and volatile memory, and can includes a ROM (Read Only Memory) device, a RAM (Random Access Memory) device, a hard disk, a flash drive, etc. The controller 54 can be part of a cycle computer or a separate unit that is mounted to the human-powered vehicle A.

Here, the controller 54 includes a communicator 64. However, the communicator 64 can be a separate element that is connected to the controller 54. In any case, the communicator 64 is a hardware device capable of transmitting an analog or digital signal over a communication wire, and/or wirelessly. In the case in which the communicator 64 carries out wireless communications with one or more of the detectors 52A to 52H, then the communicator 64 constitutes a wireless communicator. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for short range wireless communications as understood in the bicycle field.

Here, the communicator 64 preferably includes a two-way wireless communicator such as a transceiver such that can wirelessly receive information or data and transmit control signals, and that a wired communicator that can receive information or data and transmit control signals via communication wires. However, the communicator 64 can includes a one-way wireless communicator such as a receiver for receiving information or data from one or more of the detectors 52A to 52H, and a wired communicator that transmit control signals via communication wires. Alternatively, the communicator 64 can includes a one-way wireless communicator such as a transmitter for transmitting control signals to adjust, control or set the front fork FF, the rear shock absorber RS, the electric adjustable seatpost SP, the electric rear derailleur 28 and the electric assist motor 30, and a wired communicator that receives information or data from the detectors 52A to 52H via communication wires.

With reference to the flow charts of FIGS. 3 to 5, a first suspension control for changing the operation states of the rear shock absorber RS and the front fork FF will now be described. When the human-powered vehicle A starts to move, the precise speed detector 52F will be activated to produce a signal that is sent to wake up the controller 54 and start the process of the flowchart shown in FIG. 3. As long as the controller 54 is supplied with power and the human-powered vehicle A is moving, the controller 54 executes the process from step S1 in predetermined cycles.

In step S1, the controller 54 receives the indirect pedal state detection results from one or more of the detectors 52A to 52H. In other words, the detectors 52A to 52H detect information relating to a running condition of the human-powered vehicle indirectly indicative of a pedaling state of the human-powered vehicle A, and outputs signals wirelessly and/or via wires to the controller 54. Then, the controller 54 proceeds to step S2.

In step S2, the controller 54 determines whether a pedaling state exists or a non-pedaling state exists based on at least one of the indirect pedaling state detection results from the detectors 52A to 52H. For example, using the tire air pressure detector 52A, the controller 54 determines a pedaling state exists when the tire air pressure is determined to be small and the frequency stability (fluctuation in the tire air pressure in a predetermined time interval) is tire air pressure determined to be medium. Below is a correlation table 1 that is prestored in the memory device 62 for determining whether a pedaling state exists or a non-pedaling state exists using the tire air pressure detector 52A. The correlation table 1 is only one example of parameters that can be used to determine whether a pedaling state exists or a non-pedaling state exists without directly detecting pedaling. Thus, the parameters and values in the correlation table 1 could be changed or adapted as needed and/or desired. The reading or determining also could be change as needed and/or desired. For example, the frequency stability can be determined based a tire air pressure and other parameters.

| Correlation Table 1 | | |
|---|---|---|
| Tire Air Pressure Value (Bar) | Frequency Stability | Pedaling Determination |
| Small (1 to 1.5) | Medium | Pedaling |
| Small (1 to 1.5) | Medium | Pedaling |
| Small (1 to 1.5) | Medium | Pedaling |
| Medium (1.5 to 1.8) | High | Pedaling |
| Medium (1.5 to 1.8) | High | Pedaling |
| Medium (1.5 to 1.8) | High | Pedaling |
| Large (>1.8) | No | No Pedaling |
| Large (>1.8) | No | No Pedaling |
| Large (>1.8)) | No | No Pedaling |
| Small (1 to 1.5) | No | No Pedaling |
| Small (1 to 1.5) | No | No Pedaling |
| Small (1 to 1.5) | No | No Pedaling |

While only tire air pressure is used to determine whether a pedaling state exists or a non-pedaling state exists, other parameters may be used alone or in combination. For example, below is a correlation table 2 that is prestored in the memory device 62 for determining whether a pedaling state exists or a non-pedaling state exists forward acceleration using the detection results of the vehicle acceleration detector 52B. Similar to correlation table 1, the correlation table 2 is merely, and thus, the parameters and values in the correlation table 2 could be changed or adapted as needed and/or desired.

| Correlation Table 2 | | |
|---|---|---|
| Forward Acceleration (km/s²) | Frequency Stability | Pedaling Determination |
| Small (<20) | Medium | Pedaling |
| Small (<20) | Medium | Pedaling |
| Small (<20) | Medium | Pedaling |
| Medium (20 to 50) | High | Pedaling |
| Medium (20 to 50) | High | Pedaling |
| Medium (20 to 50) | High | Pedaling |
| Large (>50) | No | No Pedaling |
| Large (>50) | No | No Pedaling |
| Large (>50) | No | No Pedaling |

Below is a correlation table 3 that is prestored in the memory device 62 for determining whether a pedaling state exists or a non-pedaling state exists based on pedaling torque using the detection results of the pedaling torque detector 52C. Similar to correlation table 1, the correlation table 3 is merely, and thus, the parameters and values in the correlation table 3 could be changed or adapted as needed and/or desired.

| Correlation Table 3 | | |
|---|---|---|
| Pedaling Torque (Nm) | Frequency Stability | Pedaling Determination |
| Small (10 to 20) | Medium | Pedaling |
| Small (10 to 20) | Medium | Pedaling |
| Small (10 to 20) | Medium | Pedaling |
| Medium (20 to 40) | High | Pedaling |
| Medium (20 to 40) | Hig | Pedaling |
| Medium (20 to 40) | High | Pedaling |
| Large (>40) | No | No Pedaling |
| Large (>40) | No | No Pedaling |
| Large (>40) | No | No Pedaling |

Alternatively, the pedaling torque can be an average pedaling torque over a predetermined time period. In such a case, the values for the average pedaling torque would be about half of the values for the peak pedaling torque in Table 3.

Below is a correlation table 4 that is prestored in the memory device 62 for determining whether a pedaling state exists or a non-pedaling state exists based on forward acceleration using the detection results of the handlebar load detector 52D. Similar to correlation table 1, the correlation table 4 is merely, and thus, the parameters and values in the correlation table 4 could be changed or adapted as needed and/or desired.

| Correlation Table 4 | | |
|---|---|---|
| Handle Load (N) | Frequency Stability | Pedaling Determination |
| Small (<20) | Medium | Pedaling |
| Small (<20) | Medium | Pedaling |
| Small (<20) | Medium | Pedaling |
| Medium (20 to 50) | High | Pedaling |
| Medium (20 to 50) | High | Pedaling |
| Medium (20 to 50) | High | Pedaling |
| Large (>50) | No | No Pedaling |
| Large (>50) | No | No Pedaling |
| Large (>50) | No | No Pedaling |

Below is a correlation table 5 that is prestored in the memory device 62 for determining whether a pedaling state exists or a non-pedaling state exists based on forward acceleration using the detection results of the saddle load detector 52E. Similar to correlation table 1, the correlation table 5 is merely, and thus, the parameters and values in the correlation table 5 could be changed or adapted as needed and/or desired.

| Correlation Table 5 | | |
|---|---|---|
| Saddle Load (N) | Frequency Stability | Pedaling Determination |
| Small (<200) | Medium | Pedaling |
| Small (<200) | Medium | Pedaling |
| Small (<200) | Medium | Pedaling |
| Medium (200 to 400) | High | Pedaling |
| Medium (200 to 400) | High | Pedaling |
| Medium (200 to 400) | High | Pedaling |
| Large (>400) | No | No Pedaling |
| Large (>400) | No | No Pedaling |
| Large (>400) | No | No Pedaling |

Below is a correlation table 6 that is prestored in the memory device 62 for determining whether a pedaling state exists or a non-pedaling state exists based on forward acceleration using the detection results of the precise speed detector 52F. Similar to correlation table 1, the correlation table 6 is merely, and thus, the parameters and values in the correlation table 6 could be changed or adapted as needed and/or desired.

| Correlation Table 6 | | |
|---|---|---|
| Precise Speed (km/h) | Frequency Stability | Pedaling Determination |
| Small (<15) | Medium | Pedaling |
| Small (<15) | Medium | Pedaling |
| Small (<15) | Medium | Pedaling |
| Medium (15 to 25) | High | Pedaling |
| Medium (15 to 25) | High | Pedaling |
| Medium (15 to 25) | High | Pedaling |
| Large (>25) | No | No Pedaling |
| Large (>25) | No | No Pedaling |
| Large (>25) | No | No Pedaling |

The controller 54 can determine whether a pedaling state exists or a non-pedaling state exists based on other running condition parameters such as the operation of the electric assist motor 30. Basically, the correlation table for an assist power output curve of the electric assist motor 30 can be used in the same way as the other running condition parameters in the other correlation tables. Generally, the assist power output can be considered as output by the drive unit for an assist bike. For example, an assist power system has 3 power assist modes/ratios (eco, normal and high) that can be considered as small, medium or high output. The assist power output curve and the power range based on the curve currently defaults to one that is determined based on the power output of the rider. The assist power output is not detected directly as the output ranged in a fixed value. It is possible though to detect the output based on sensing the chain tension or using indirect parameter to detect the output. Alternatively, the electric assist motor 30 can be a specific sensor for detecting the assist power output of the electric assist motor 30.

The controller 54 can determine whether a pedaling state exists or a non-pedaling state exists based on other running condition parameters such as the tension of the chain 24. Basically, the correlation table for chain tension can be used in the same way as the other running condition parameters in the other correlation tables. In addition, the chain tension can be determined from moving speed change, rotation of a chain tensioner, vibration or rotation swing of chain ring, etc., which are a function of change in chain tension. The general example of sensor used to detecting chain tension is the bicycle driving sensor, which is a chain tension sensor having a tension sensing arm with a pair of tensioning rollers. The tension sensing arm is coupled to the rear frame for pivotal movement. The tension sensing arm is biased by a spring such that the rollers contact the chain on opposite sides so as to cause the chain to bend partially around each of the rollers. When the chain tension increases, the chain will urge the rollers against the force of the spring on the tension sensing arm so as to rotate the tension sensing arm. This rotation of the tension sensing arm causes a pressure switch to be engaged indicating the amount of tension being applied to the chain. Of course, the above described chain tension sensor is only an example, and the present invention is not limited to this particular chain tension sensor.

Moreover, while these correlation tables are indicated as individual tables with only one running condition parameter, the present invention is not limited to this configuration. Rather, one or more of the running condition parameters can be used together for determining a pedaling state or a non-pedaling state to adjust the suspension. The frequency stability in these correlation tables refers to a running condition of the human-powered vehicle A in a predetermined period/time interval.

After the controller 54 determines whether a pedaling state exists or a non-pedaling state exists in step S2, the controller 54 then proceeds to either step S3 or step S4 based on whether a pedaling state exists or a non-pedaling state. If a pedaling state exists is determined to exist, then the controller 54 proceeds to step S3. However, if a non-pedaling state exists is determined to exist, then the controller 54 proceeds to step S4.

In step S3, the controller 54 executes a subroutine to set the suspension settings of the rear shock absorber RS and/or the front fork FF for a pedaling state based on terrain conditions as determined using at least one of the indirect pedaling state detection results from the detectors 52A to 52H. Then, the controller 54 proceeds to step S5 where one or more control signals are outputted to the rear shock absorber RS and/or the front fork FF.

In step S4, the controller 54 executes a subroutine to set the suspension settings of the rear shock absorber RS and/or the front fork FF for a non-pedaling state based on terrain conditions as determined using at least one of the indirect pedaling state detection results from the detectors 52A to 52H. Then, the controller 54 proceeds to step S5 where one or more control signals are outputted to the rear shock absorber RS and/or the front fork FF.

Thus, in step S5, based on the information or data from one or more of the detectors 52A to 52H, the controller 54 produces one or more control signals for changing the operation states of the rear shock absorber RS and/or the front fork FF. These control signals adjusts at least one of a suspension stroke, a spring preload, a damping and a lockout of the rear shock absorber RS and/or the front fork FF).

Referring now to the subroutine (step S3 in FIG. 3) of FIG. 4, the controller 54 adjusts the suspension settings of the rear shock absorber RS and/or the front fork FF based on at least one terrain condition for when it is determined that a pedaling state exists. As used herein, the term "terrain condition" includes inclination of the traveling surface, roughness of the traveling surface, obstacles on the traveling surface, or other conditions of the traveling surface that affect the human-powered vehicle A.

In step S31, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S31, the controller 54 then proceeds to one of steps S32, S33 or S34 based on the level of the impact (i.e., at least traveling surface roughness) of the terrain on the human-powered vehicle A.

In the case where the level of the impact of the terrain on the human-powered vehicle A is determined to be large, the controller 54 then proceeds to step S32. In step S32, the controller 54 uses first suspension settings that are prestored in the memory device 64 for setting or adjusting the suspension settings of the rear shock absorber RS and/or the front fork FF. For example, as seen in FIG. 6, the first suspension settings can include setting a spring force to open, a damping to strong, a rear stroke to long and a front stroke to long.

In the case where the level of the impact of the terrain on the human-powered vehicle A is determined to be medium, the controller 54 then proceeds to step S33. In step S33, the controller 54 uses second suspension settings that are prestored in the memory device 64 for setting or adjusting the suspension settings of the rear shock absorber RS and/or the front fork FF. For example, as seen in FIG. 7, the second suspension settings can include setting a spring force to medium, a damping to medium, a rear stroke to long or mid and a front stroke to long or mid. The term "mid" as used herein refers to maintaining a current setting (no adjustment) or setting to medium.

In the case where the level of the impact of the terrain on the human-powered vehicle A is determined to be small or zero, the controller 54 then proceeds to step S34. In step S34, the controller 54 determines traveling surface inclination (i.e., an impact that is different from the impact (e.g., traveling surface roughness) of step S31) of the terrain human-powered vehicle A. Once a judgement is made as to the inclination of the human-powered vehicle A in step S34, the controller 54 then proceeds to one of steps S35, S36 or S37 based on the inclination of the human-powered vehicle A.

In the case where the inclination of the human-powered vehicle A is determined to be ascending, the controller 54 uses third suspension settings that are prestored in the memory device 64 for setting or adjusting the suspension settings of the rear shock absorber RS and/or the front fork FF. For example, as seen in FIG. 8, the third suspension settings can include setting a spring force to closed or mid, a damping to slow or mid, a rear stroke to long and a front stroke to short.

In the case where the inclination of the human-powered vehicle A is determined to be flat (level), the controller 54 uses fourth suspension settings that are prestored in the memory device 64 for setting or adjusting the suspension settings of the rear shock absorber RS and/or the front fork FF. For example, as seen in FIG. 9, the fourth suspension settings can include setting a spring force to closed or mid, a damping to slow or mid, a rear stroke to mid or long and a front stroke to mid or long.

In the case where the inclination of the human-powered vehicle A is determined to be descending, the controller 54 uses fifth suspension settings that are prestored in the memory device 64 for setting or adjusting the suspension settings of the rear shock absorber RS and/or the front fork FF. For example, as seen in FIG. 10, the fifth suspension settings can include setting a spring force to closed or mid, a damping to slow or mid, a rear stroke to short and a front stroke to long.

Figure 3:
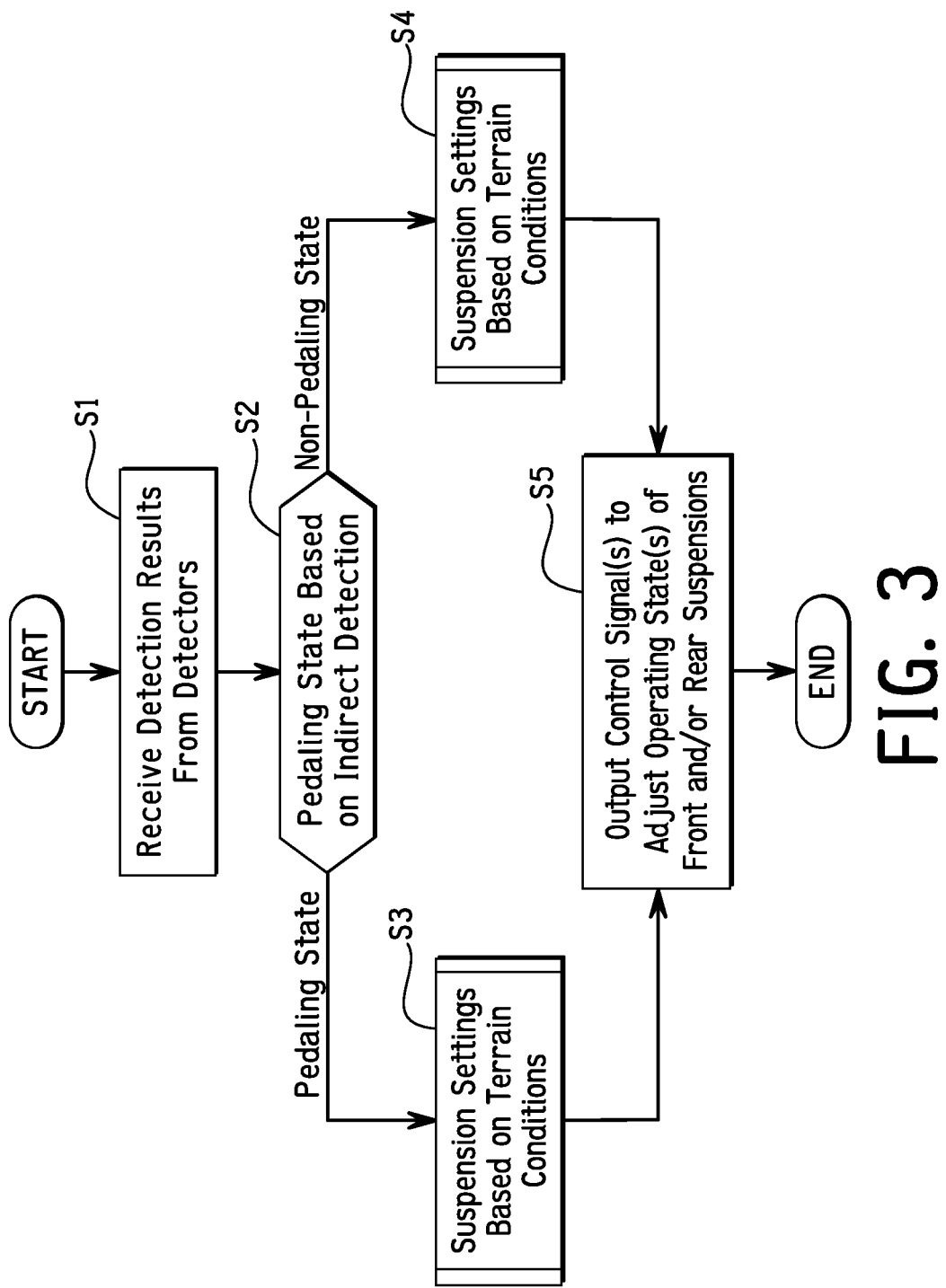
FIG. 3 is a flowchart of an automatic suspension control executed by the electronic controller of the suspension control system for automatically changing an operating state of at least one of the front suspension and the rear suspension of the human-powered vehicle of FIG. 1 in accordance with information (detection results) from a detector that indirectly detects a pedaling state of the human-powered vehicle.

After steps S32, S33, S35, S36 or S37, the controller 54 then proceeds to step S5 of the flow chart of FIG. 3.

Referring now to the subroutine (step S4 in FIG. 3) of FIG. 5, the controller 54 adjusts the suspension settings of the rear shock absorber RS and/or the front fork FF based on at least one terrain condition for when it is determined that a non-pedaling state exists. As mentioned above, the term "terrain condition" includes inclination of the traveling surface, roughness of the traveling surface, obstacles on the traveling surface, or other conditions of the traveling surface that affect the human-powered vehicle A.

In step S41, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S41, the controller 54 then proceeds to one of steps S42, S43 or S44 based on the level of the impact of the terrain on the human-powered vehicle A.

In the case where the level of the impact of the terrain on the human-powered vehicle A is determined to be large, the controller 54 then proceeds to step S42. In step S42, the controller 54 uses sixth suspension settings that are prestored in the memory device 64 for setting or adjusting the suspension settings of the rear shock absorber RS and/or the front fork FF. For example, as seen in FIG. 11, the sixth suspension settings can include setting a spring force to open, a damping to strong, a rear stroke to long and a front stroke to long.

In the case where the level of the impact of the terrain on the human-powered vehicle A is determined to be medium, the controller 54 then proceeds to step S43. In step S43, the controller 54 uses seventh suspension settings that are prestored in the memory device 64 for setting or adjusting the suspension settings of the rear shock absorber RS and/or the front fork FF. For example, as seen in FIG. 12, the seventh suspension settings can include setting a spring force to medium, a damping to medium, a rear stroke to long or mid and a front stroke to long or mid.

In the case where the level of the impact of the terrain on the human-powered vehicle A is determined to be small or zero, the controller 54 then proceeds to step S44. In step S44, the controller 54 determines traveling surface inclination (i.e., an impact that is different from the impact (e.g., traveling surface roughness) of step S31) of the terrain human-powered vehicle A. Once a judgement is made as to the inclination of the human-powered vehicle A in step S44, the controller 54 then proceeds to one of steps S45, S46 or S47 based on the inclination of the human-powered vehicle A.

In the case where the inclination of the human-powered vehicle A is determined to be ascending, the controller 54 uses eighth suspension settings that are prestored in the memory device 64 for setting or adjusting the suspension settings of the rear shock absorber RS and/or the front fork FF. For example, as seen in FIG. 13, the eighth suspension settings can include setting a spring force to closed or mid, a damping to slow or mid, a rear stroke to long and a front stroke to short.

In the case where the inclination of the human-powered vehicle A is determined to be flat (level), the controller 54 uses fourth suspension settings that are prestored in the memory device 64 for setting or adjusting the suspension settings of the rear shock absorber RS and/or the front fork FF. For example, as seen in FIG. 14, the ninth suspension settings can include setting a spring force to closed or mid, a damping to slow or mid, a rear stroke to mid or long and a front stroke to mid or long.

In the case where the inclination of the human-powered vehicle A is determined to be descending, the controller 54 uses tenth suspension settings that are prestored in the memory device 64 for setting or adjusting the suspension settings of the rear shock absorber RS and/or the front fork FF. For example, as seen in FIG. 15, the tenth suspension settings can include setting a spring force to closed or mid, a damping to slow or mid, a rear stroke to short and a front stroke to long.

After steps S42, S43, S45, S46 or S47, the controller 54 then proceeds to step S5 of the flow chart of FIG. 3.

Figure 16:
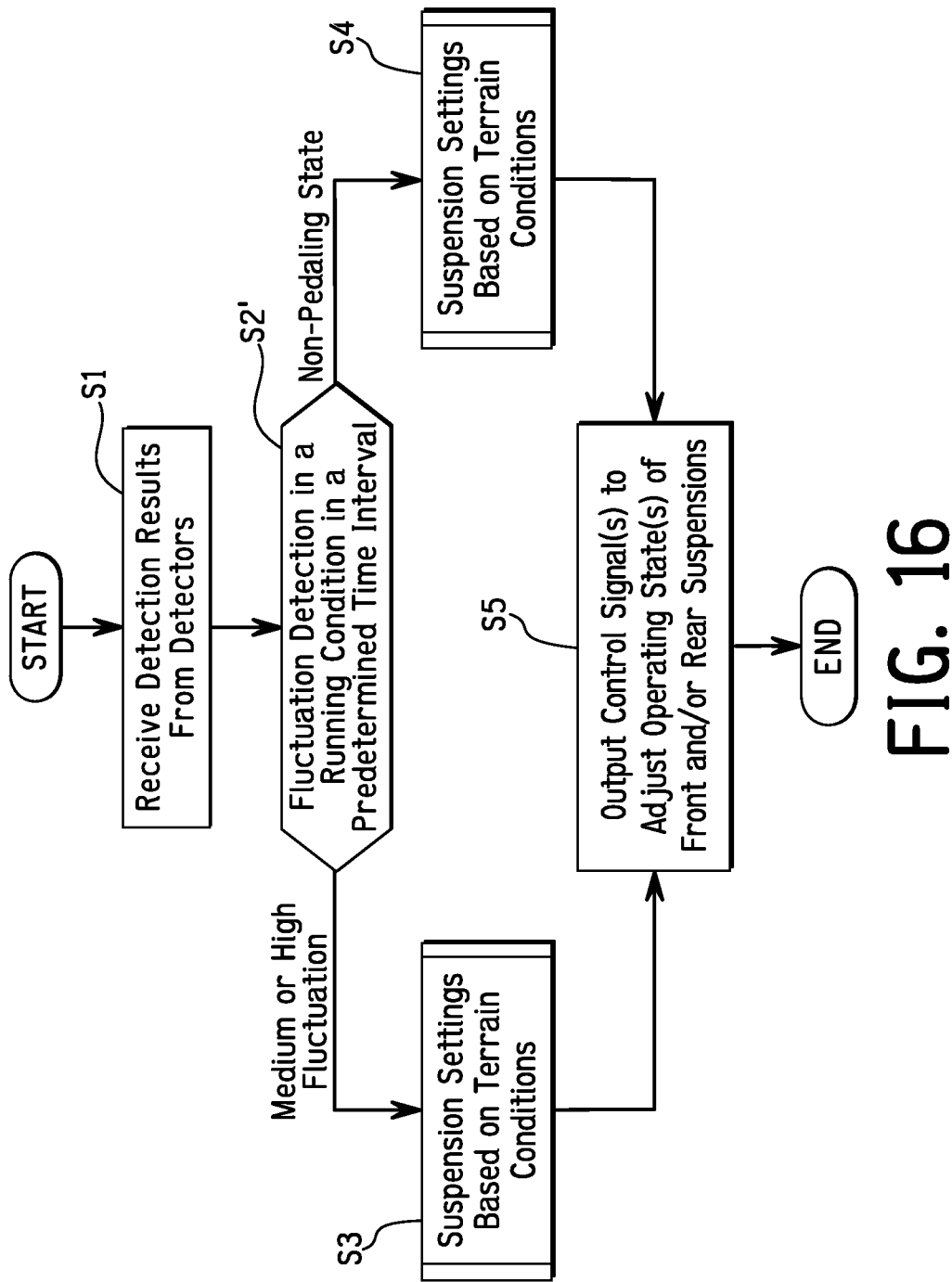
FIG. 16 is a flowchart of an automatic suspension control executed by the electronic controller of the suspension control system for automatically changing an operating state of at least one of the front suspension and the rear suspension of the human-powered vehicle of FIG. 1 in accordance with information (detection results) from a fluctuation detector that detects a fluctuation in a running condition of the human-powered vehicle in a predetermined time interval.

With reference to the flow chart of FIG. 16, a second suspension control for changing the operation states of the rear shock absorber RS and the front fork FF will now be described. Basically, the second suspension control of the flow chart of FIG. 16 is identical to the first suspension control of the flow chart of FIG. 3, except that the information or data from the detectors 52A to 52H is analyzed differently. Thus, the steps that are identical will be given the same reference symbol and will not discussed again for the sake of brevity.

In the second suspension control of the flow chart of FIG. 16, all of the steps are the same as in the first suspension control of the flow chart of FIG. 3, except that step S2 has been replaced with step S2'. Here, in step S2', the controller 54 determines whether a pedaling state exists or a non-pedaling state exists based solely on a fluctuation (frequency stability) of at least one of the indirect pedaling state detection results from the detectors 52A to 52H. In other words, only the frequency stability information or data in the correlation tables 1 to 6 will be used to determine whether a pedaling state exists or a non-pedaling state exists. In contrast, in the first suspension control of the flow chart of FIG. 3, only the current value or the average value for a predetermined time period of one or more of the detection parameters from the detectors 52A to 52H is used either by itself or in conjunction with the frequency stability (fluctuation) of the detection parameters from the detectors 52A to 52H.

Figure 17:
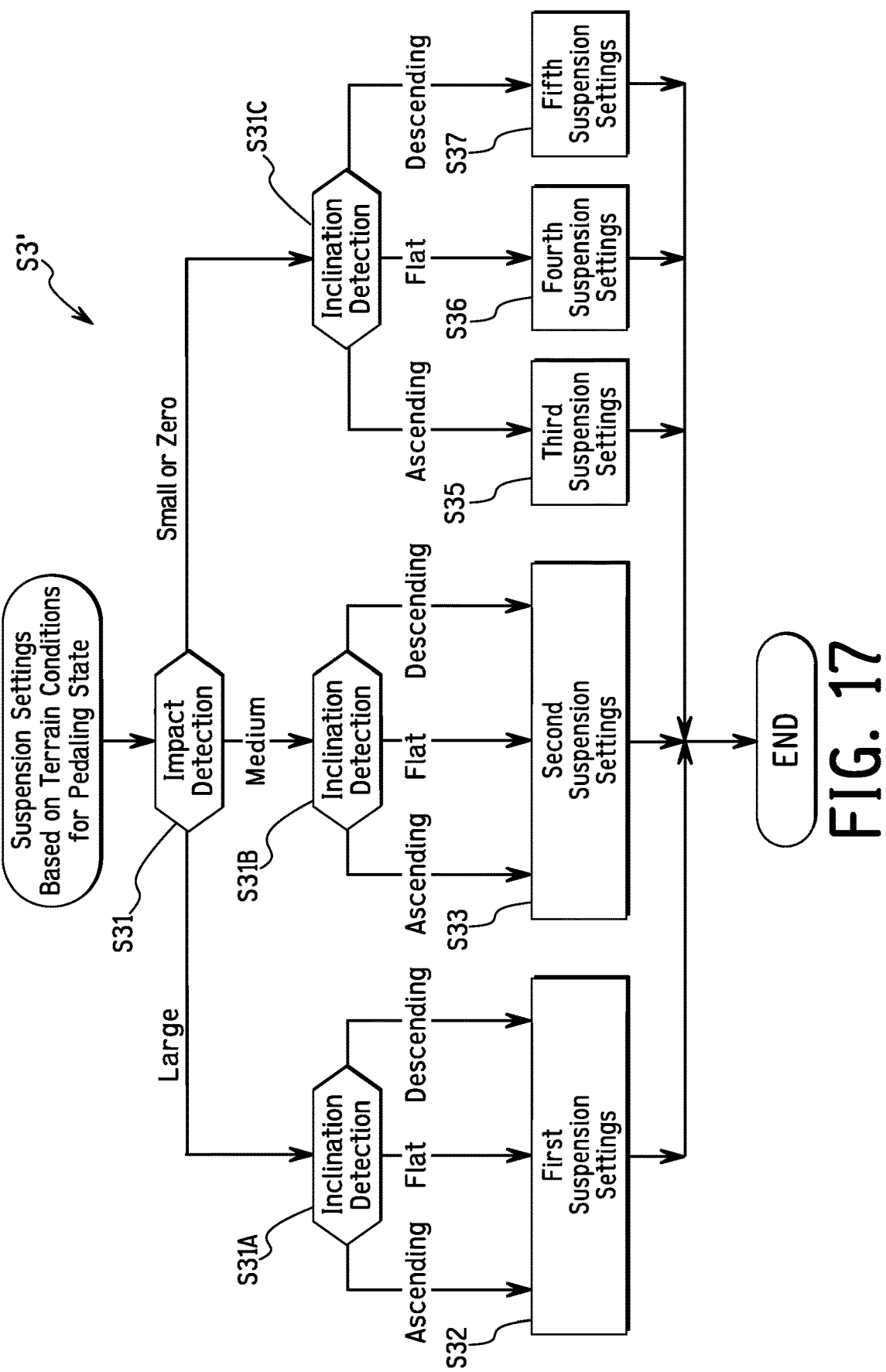
FIG. 17 is a flowchart of an alternative subroutine of the automatic suspension control of FIG. 3 that is executed by the electronic controller of the suspension control system upon determining a pedaling state exists.

Referring now to a suspension control of a subroutine (step S3') of FIG. 17 will now be discussed. Here, the subroutine (step S3') of FIG. 17 replaces the subroutine (step S3) of FIG. 3. Thus, in the subroutine (step S3'), the controller 54 adjusts the suspension settings of the rear shock absorber RS and/or the front fork FF based on at least one terrain condition for when it is determined that a pedaling state exists. Thus, the steps of the subroutine (step S3') of FIG. 17 that are identical to the subroutine (step S3) of FIG. 3 will be given the same reference symbol and will not discussed again for the sake of brevity.

In step S31, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S31, the controller 54 then proceeds to one of steps S31A, S31B or S31C based on the level of the impact (i.e., at least traveling surface roughness) of the terrain on the human-powered vehicle A.

In the case where the level of the impact of the terrain on the human-powered vehicle A is determined to be large, the controller 54 then proceeds to step S31A. In step S31A, the controller 54 determines traveling surface inclination (i.e., an impact that is different from the impact (e.g., traveling surface roughness) of step S31) of the terrain human-powered vehicle A. Once a judgement is made as to the inclination of the human-powered vehicle A in step S31A, the controller 54 then proceeds to step S32. In this suspension control process, the controller 54 adjusts the suspension settings of the rear shock absorber RS and/or the front fork FF to the first suspension settings (e.g., FIG. 6) regardless of the inclination that is detected. Of course, the user or manufacturer can set different suspension settings for each of an ascending traveling condition, a flat surface traveling condition and a descending traveling condition.

In the case where the level of the impact of the terrain on the human-powered vehicle A is determined to be medium, the controller 54 then proceeds to step S31B. In step S31B, the controller 54 determines traveling surface inclination (i.e., an impact that is different from the impact (e.g., traveling surface roughness) of step S31) of the terrain human-powered vehicle A. Once a judgement is made as to the inclination of the human-powered vehicle A in step S31B, the controller 54 then proceeds to step S33. In this suspension control process, the controller 54 adjusts the suspension settings of the rear shock absorber RS and/or the front fork FF to the first suspension settings (e.g., FIG. 7) regardless of the inclination that is detected. Of course, the user or manufacturer can set different suspension settings for each of an ascending traveling condition, a flat surface traveling condition and a descending traveling condition.

In the case where the level of the impact of the terrain on the human-powered vehicle A is determined to be small or zero, the controller 54 then proceeds to step S31C. In step S31C, the controller 54 determines traveling surface inclination (i.e., an impact that is different from the impact (e.g., traveling surface roughness) of step S31) of the terrain human-powered vehicle A. Once a judgement is made as to the inclination of the human-powered vehicle A in step S31C, the controller 54 then proceeds to one of steps S35, S36 or S37 based on the inclination of the human-powered vehicle A.

In the case where the inclination of the human-powered vehicle A is determined to be ascending in step S31C, the controller 54 uses the third suspension settings (e.g., FIG. 8) that are prestored in the memory device 64 for setting or adjusting the suspension settings of the rear shock absorber RS and/or the front fork FF.

In the case where the inclination of the human-powered vehicle A is determined to be flat (level) in step S31C, the controller 54 uses the fourth suspension settings (e.g., FIG. 9) that are prestored in the memory device 64 for setting or adjusting the suspension settings of the rear shock absorber RS and/or the front fork FF.

In the case where the inclination of the human-powered vehicle A is determined to be descending in step S31C, the controller 54 uses fifth suspension settings that are prestored in the memory device 64 for setting or adjusting the fifth suspension settings (e.g., FIG. 10) of the rear shock absorber RS and/or the front fork FF.

After steps S32, S33, S35, S36 or S37, the controller 54 then proceeds to step S5 of the flow chart of FIG. 3.

Figure 18:
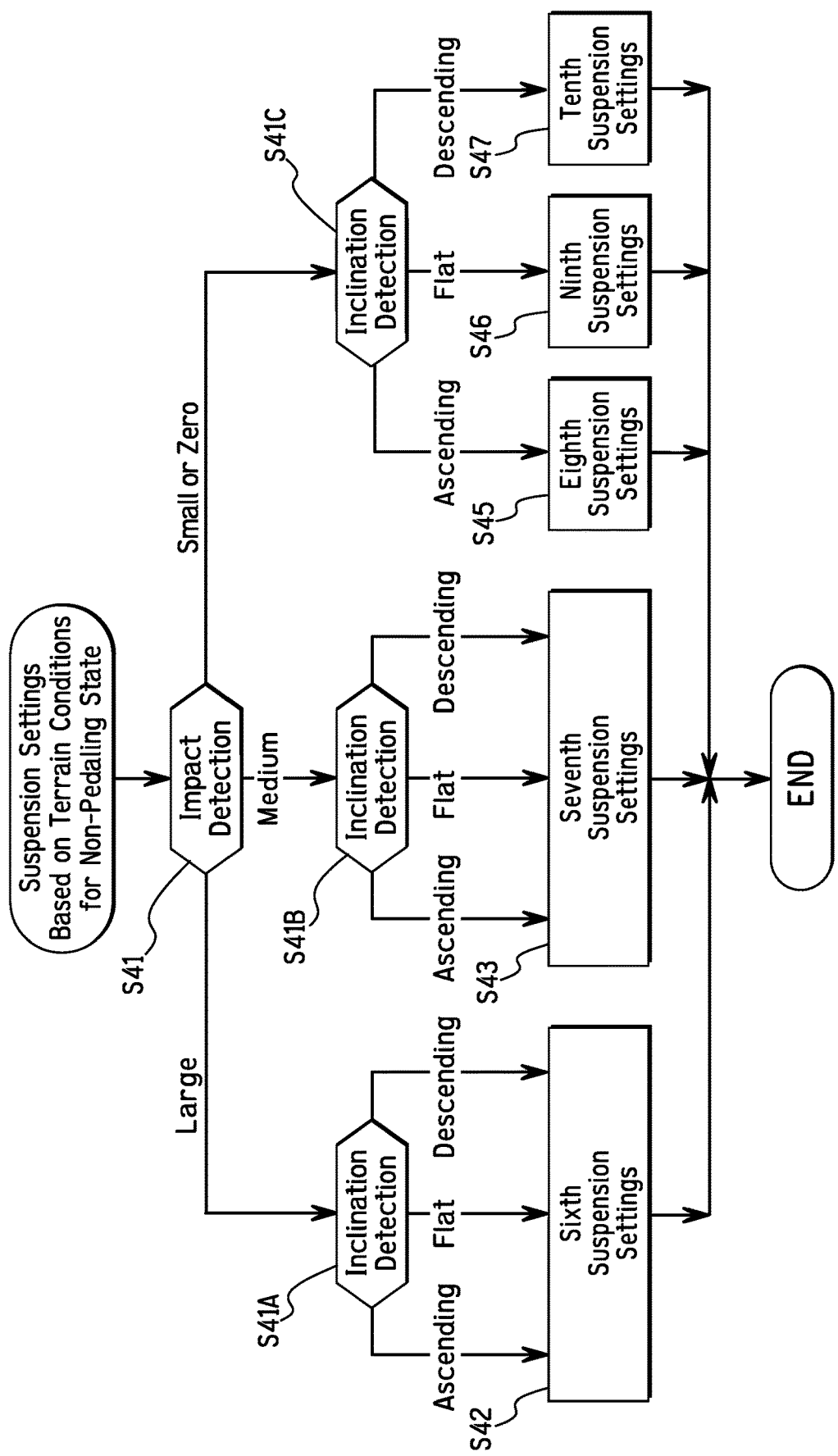
FIG. 18 is a flowchart of an alternative subroutine of the automatic suspension control of FIG. 3 that is executed by the electronic controller of the suspension control system upon determining a non-pedaling state exists.

Referring now to a suspension control of a subroutine (step S4') of FIG. 18 will now be discussed. Here, the subroutine (step S4') of FIG. 18 replaces the subroutine (step S4) of FIG. 3. Thus, in the subroutine (step S4'), the controller 54 adjusts the suspension settings of the rear shock absorber RS and/or the front fork FF based on at least one terrain condition for when it is determined that a non-pedaling state exists. Thus, the steps of the subroutine (step S4') of FIG. 18 that are identical to the subroutine (step S4) of FIG. 3 will be given the same reference symbol and will not discussed again for the sake of brevity.

In step S41, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S41, the controller 54 then proceeds to one of steps S41A, S41B or S41C based on the level of the impact (i.e., at least traveling surface roughness) of the terrain on the human-powered vehicle A.

In the case where the level of the impact of the terrain on the human-powered vehicle A is determined to be large, the controller 54 then proceeds to step S41A. In step S41A, the controller 54 determines traveling surface inclination (i.e., an impact that is different from the impact (e.g., traveling surface roughness) of step S41) of the terrain human-powered vehicle A. Once a judgement is made as to the inclination of the human-powered vehicle A in step S41A, the controller 54 then proceeds to step S42. In this suspension control process, the controller 54 adjusts the suspension settings of the rear shock absorber RS and/or the front fork FF to the sixth suspension settings (e.g., FIG. 11) regardless of the inclination that is detected. Of course, the user or manufacturer can set different suspension settings for each of an ascending traveling condition, a flat surface traveling condition and a descending traveling condition.

In the case where the level of the impact of the terrain on the human-powered vehicle A is determined to be medium, the controller 54 then proceeds to step S41B. In step S41B, the controller 54 determines traveling surface inclination (i.e., an impact that is different from the impact (e.g., traveling surface roughness) of step S41) of the terrain human-powered vehicle A. Once a judgement is made as to the inclination of the human-powered vehicle A in step S41B, the controller 54 then proceeds to step S43. In this suspension control process, the controller 54 adjusts the suspension settings of the rear shock absorber RS and/or the front fork FF to the seventh suspension settings (e.g., FIG. 12) regardless of the inclination that is detected. Of course, the user or manufacturer can set different suspension settings for each of an ascending traveling condition, a flat surface traveling condition and a descending traveling condition.

In the case where the level of the impact of the terrain on the human-powered vehicle A is determined to be small or zero, the controller 54 then proceeds to step S41C. In step S41C, the controller 54 determines traveling surface inclination (i.e., an impact that is different from the impact (e.g., traveling surface roughness) of step S41) of the terrain human-powered vehicle A. Once a judgement is made as to the inclination of the human-powered vehicle A in step S41C, the controller 54 then proceeds to one of steps S45, S46 or S47 based on the inclination of the human-powered vehicle A.

In the case where the inclination of the human-powered vehicle A is determined to be ascending in step S41C, the controller 54 uses the eighth suspension settings (e.g., FIG. 13) that are prestored in the memory device 64 for setting or adjusting the suspension settings of the rear shock absorber RS and/or the front fork FF.

In the case where the inclination of the human-powered vehicle A is determined to be flat (level) in step S41C, the controller 54 uses the ninth suspension settings (e.g., FIG. 14) that are prestored in the memory device 64 for setting or adjusting the suspension settings of the rear shock absorber RS and/or the front fork FF.

In the case where the inclination of the human-powered vehicle A is determined to be descending in step S41C, the controller 54 uses tenth suspension settings (e.g., FIG. 15) that are prestored in the memory device 64 for setting or adjusting the suspension settings of the rear shock absorber RS and/or the front fork FF.

After steps S42, S44, S45, S46 or S47, the controller 54 then proceeds to step S5 of the flow chart of FIG. 3.

Referring now to a suspension control of a subroutine (step S3") of FIG. 19 and a suspension control of a subroutine (step S4') of FIG. 20 will now be discussed. Here, the subroutine (step S3") of FIG. 19 replaces the subroutine (step S3) of FIG. 3, while the subroutine (step S4") of FIG. 20 replaces the subroutine (step S4) of FIG. 3. Basically, the subroutines (steps S3" and S S4") of FIGS. 19 and 20 considers traveling surface roughness, traveling surface inclination and riding posture of the rider in determining the suspension settings of the rear shock absorber RS and/or the front fork FF based on at least one terrain. In the pedaling state subroutine (step S3"), the controller 54 adjusts the suspension settings of the rear shock absorber RS and/or the front fork FF based on traveling surface roughness, traveling surface inclination and riding posture of the rider for when it is determined that a pedaling state exists. In the non-pedaling state subroutine (step S4"), the controller 54 adjusts the suspension settings of the rear shock absorber RS and/or the front fork FF based on traveling surface roughness, traveling surface inclination and riding posture of the rider for when it is determined that a non-pedaling state exists. Thus, the steps of the subroutines (steps S3" and S S4") of FIGS. 19 and 20 that are identical to the subroutines (steps S3 and S4) of FIG. 3 will be given the same reference symbol and will not discussed again for the sake of brevity.

Figure 21:
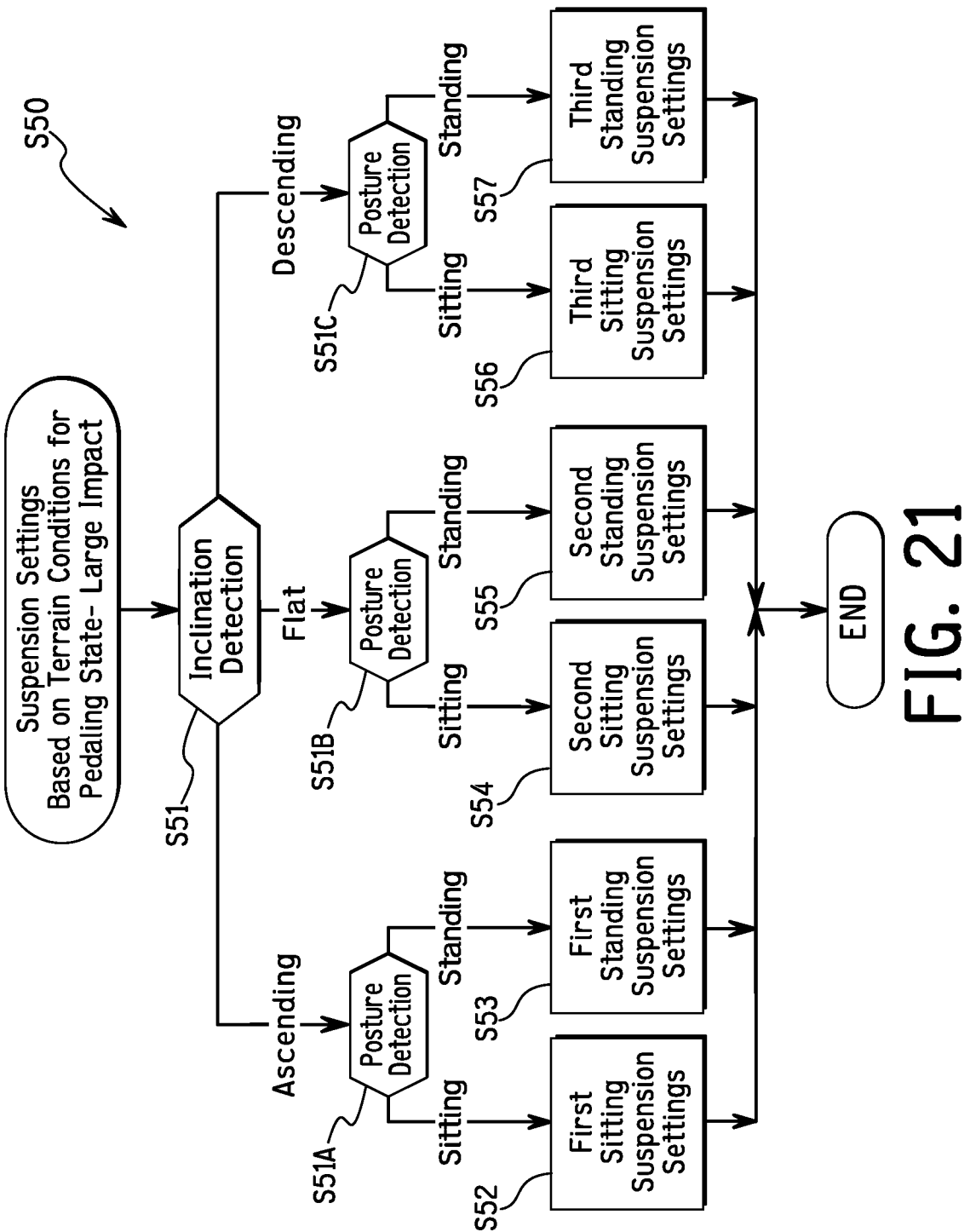
FIG. 21 is a flowchart of a further subroutine of the automatic suspension control of FIG. 19 that is executed by the electronic controller of the suspension control system upon determining a pedaling state exists and a large impact is present.
Figure 22:
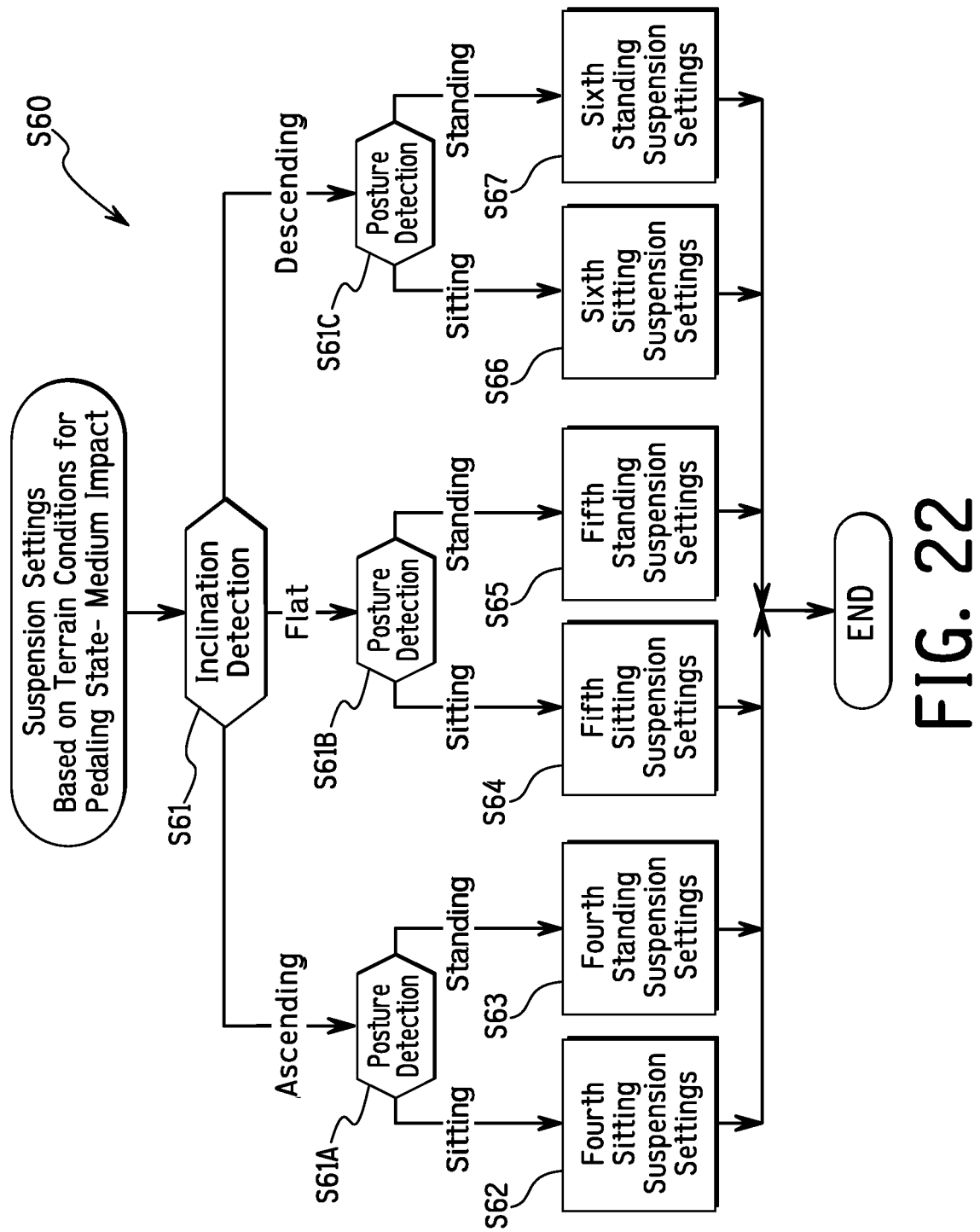
FIG. 22 is a flowchart of a further subroutine of the automatic suspension control of FIG. 19 that is executed by the electronic controller of the suspension control system upon determining a pedaling state exists and a medium impact is present.
Figure 23:
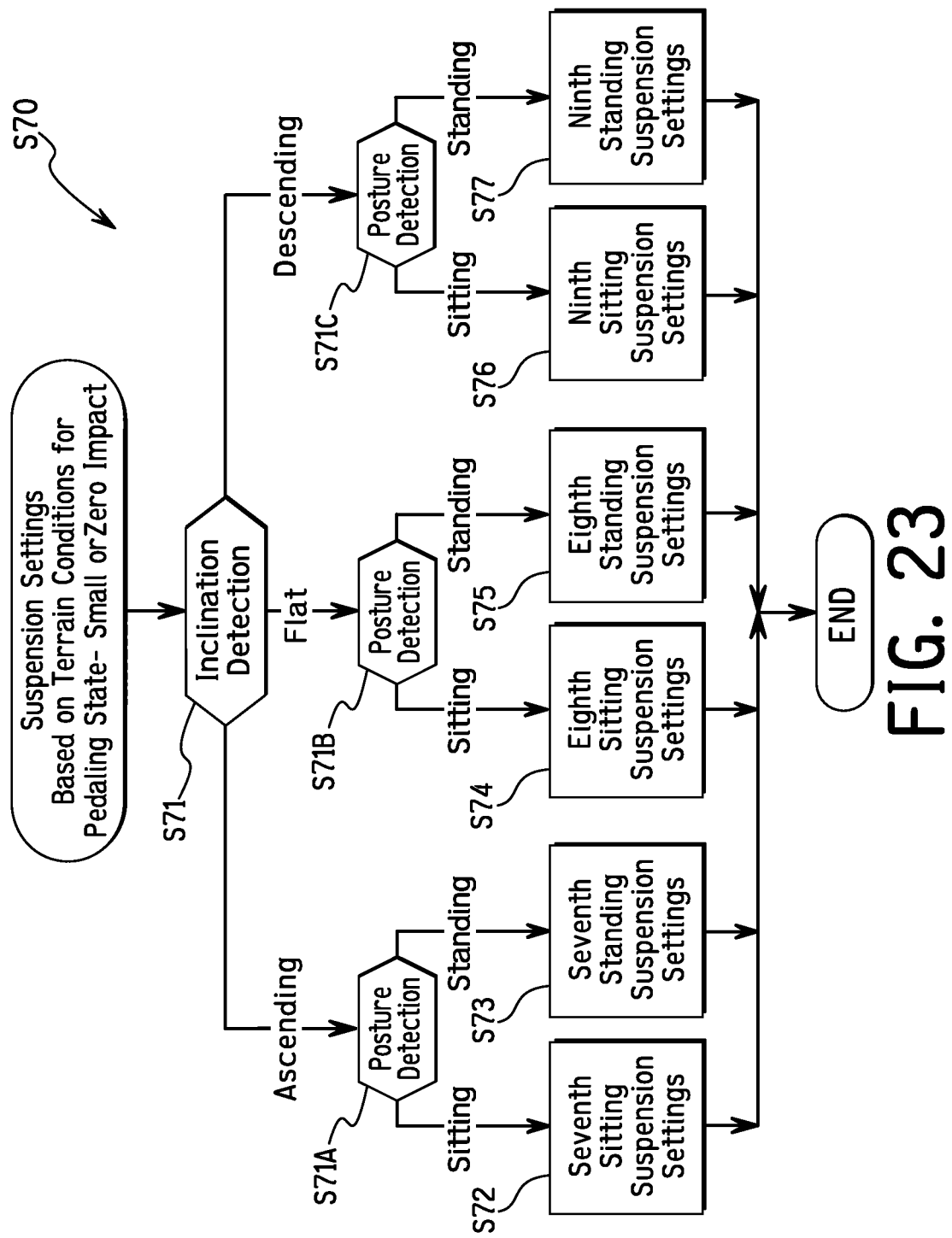
FIG. 23 is a flowchart of a further subroutine of the automatic suspension control of FIG. 19 that is executed by the electronic controller of the suspension control system upon determining a pedaling state exists and a small to zero impact is present.

Referring to the suspension control of the subroutine (step S3") of FIG. 19, in step S31, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S31, the controller 54 then proceeds to one of steps S50, S60 or S70 based on the level of the impact (i.e., at least traveling surface roughness) of the terrain on the human-powered vehicle A. The steps S50, S60 or S70 are subroutines that use traveling surface inclination and riding posture of the rider for determining the suspension settings of the rear shock absorber RS and/or the front fork FF. The subroutine of step S50 is illustrated by the flow chart of FIG. 21. The subroutine of step S60 is illustrated by the flow chart of FIG. 22. The subroutine of step S70 is illustrated by the flow chart of FIG. 23.

In the case where the level of the impact of the terrain on the human-powered vehicle A is determined to be large (FIG. 21), the controller 54 then proceeds to step S51. In step S51, the controller 54 determines traveling surface inclination of the terrain human-powered vehicle A. Once a judgement is made as to the inclination of the human-powered vehicle A in step S51, the controller 54 then proceeds to one of steps S51A, S51B or S51C based on the inclination of the human-powered vehicle A.

In the case where the inclination of the human-powered vehicle A is determined to be ascending, the controller 54 proceeds to steps S51A. In the case where the inclination of the human-powered vehicle A is determined to be flat (level), the controller 54 proceeds to steps S51B. In the case where the inclination of the human-powered vehicle A is determined to be descending, the controller 54 proceeds to steps S51C. In steps S51A, S51B or S51C, the controller 54 determines the riding posture of the rider (sitting or standing). However, this control process can be modified to determine a riding condition which includes both riding posture of the rider and other parameters as needed and/or desired.

In step S51A, when the riding posture of the rider is determined to be sitting, the controller 54 proceeds to step S52 where first sitting suspension settings are selected. For example, as seen in FIG. 27, the first sitting suspension settings can include setting a spring force to medium or open, a damping to medium, a rear stroke to long and a front stroke to short or mid. On the other hand, in step S51A, when the riding posture of the rider is determined to be standing, the controller 54 proceeds to step S53 where first standing suspension settings are selected. For example, as seen in FIG. 28, the first standing suspension settings can include setting a spring force to medium, a damping to medium or strong, a rear stroke to long and a front stroke to short or mid.

In step S51B, when the riding posture of the rider is determined to be sitting, the controller 54 proceeds to step S54 where second sitting suspension settings are selected. For example, as seen in FIG. 29, the second sitting suspension settings can include setting a spring force to medium or open, a damping to medium, a rear stroke to long or mid and a front stroke to long or mid. On the other hand, in step S51B, when the riding posture of the rider is determined to be standing, the controller 54 proceeds to step S55 where second standing suspension settings are selected. For example, as seen in FIG. 30, the second standing suspension settings can include setting a spring force to medium, a damping to medium or strong, a rear stroke to long or mid and a front stroke to long or mid.

In step S51C, when the riding posture of the rider is determined to be sitting, the controller 54 proceeds to step S56 where third sitting suspension settings are selected. For example, as seen in FIG. 31, the third sitting suspension settings can include setting a spring force to open or mid, a damping to medium, a rear stroke to short or mid, and a front stroke to long. On the other hand, in step S51C, when the riding posture of the rider is determined to be standing, the controller 54 proceeds to step S57 where third standing suspension settings are selected. For example, as seen in FIG. 32, the third standing suspension settings can include setting a spring force to mid, a damping to medium, a rear stroke to long and a front stroke to short.

In the case where the level of the impact of the terrain on the human-powered vehicle A is determined to be medium (FIG. 22), the controller 54 then proceeds to step S61. In step S61, the controller 54 determines traveling surface inclination of the terrain human-powered vehicle A. Once a judgement is made as to the inclination of the human-powered vehicle A in step S61, the controller 54 then proceeds to one of steps S61A, S61B or S61C based on the inclination of the human-powered vehicle A.

In the case where the inclination of the human-powered vehicle A is determined to be ascending, the controller 54 proceeds to steps S61A. In the case where the inclination of the human-powered vehicle A is determined to be flat (level), the controller 54 proceeds to steps S61B. In the case where the inclination of the human-powered vehicle A is determined to be descending, the controller 54 proceeds to steps S61C. In steps S61A, S61B or S61C, the controller 54 determines the riding posture of the rider (sitting or standing). However, this control process can be modified to determine a riding condition which includes both riding posture of the rider and other parameters as needed and/or desired.

In step S61A, when the riding posture of the rider is determined to be sitting, the controller 54 proceeds to step S62 where fourth sitting suspension settings are selected. For example, as seen in FIG. 33, the fourth sitting suspension settings can include setting a spring force to medium, a damping to medium, a rear stroke to long and a front stroke to short. On the other hand, in step S61A, when the riding posture of the rider is determined to be standing, the controller 54 proceeds to step S63 where fourth standing suspension settings are selected. For example, as seen in FIG. 34, the fourth standing suspension settings can include setting a spring force to medium, a damping to medium or strong, a rear stroke to long and a front stroke to short.

In step S61B, when the riding posture of the rider is determined to be sitting, the controller 54 proceeds to step S64 where fifth sitting suspension settings are selected. For example, as seen in FIG. 35, the fifth sitting suspension settings can include setting a spring force to medium, a damping to medium, a rear stroke to long or mid and a front stroke to long or mid. On the other hand, in step S61B, when the riding posture of the rider is determined to be standing, the controller 54 proceeds to step S65 where fifth standing suspension settings are selected. For example, as seen in FIG. 36, the fifth standing suspension settings can include setting a spring force to medium, a damping to medium or strong, a rear stroke to long or mid and a front stroke to long or mid.

In step S61C, when the riding posture of the rider is determined to be sitting, the controller 54 proceeds to step S66 where sixth sitting suspension settings are selected. For example, as seen in FIG. 37, the sixth sitting suspension settings can include setting a spring force to medium, a damping to medium, a rear stroke to short, and a front stroke to long. On the other hand, in step S61C, when the riding posture of the rider is determined to be standing, the controller 54 proceeds to step S67 where sixth standing suspension settings are selected. For example, as seen in FIG. 38, the sixth standing suspension settings can include setting a spring force to medium, a damping to medium or strong, a rear stroke to short and a front stroke to long.

In the case where the level of the impact of the terrain on the human-powered vehicle A is determined to be small to zero (FIG. 23), the controller 54 then proceeds to step S71. In step S71, the controller 54 determines traveling surface inclination of the terrain human-powered vehicle A. Once a judgement is made as to the inclination of the human-powered vehicle A in step S71, the controller 54 then proceeds to one of steps S71A, S71B or S71C based on the inclination of the human-powered vehicle A.

In the case where the inclination of the human-powered vehicle A is determined to be ascending, the controller 54 proceeds to steps S71A. In the case where the inclination of the human-powered vehicle A is determined to be flat (level), the controller 54 proceeds to steps S71B. In the case where the inclination of the human-powered vehicle A is determined to be descending, the controller 54 proceeds to steps S71C. In steps S71A, S71B or S71C, the controller 54 determines the riding posture of the rider (sitting or standing). However, this control process can be modified to determine a riding condition which includes both riding posture of the rider and other parameters as needed and/or desired.

In step S71A, when the riding posture of the rider is determined to be sitting, the controller 54 proceeds to step S72 where seventh sitting suspension settings are selected. For example, as seen in FIG. 39, the seventh sitting suspension settings can include setting a spring force to closed, a damping to slow or mid, a rear stroke to long and a front stroke to short. On the other hand, in step S71A, when the riding posture of the rider is determined to be standing, the controller 54 proceeds to step S73 where seventh standing suspension settings are selected. For example, as seen in FIG. 40, the seventh standing suspension settings can include setting a spring force to closed, a damping to mid or strong, a rear stroke to long and a front stroke to short.

In step S71B, when the riding posture of the rider is determined to be sitting, the controller 54 proceeds to step S74 where eighth sitting suspension settings are selected. For example, as seen in FIG. 41, the eighth sitting suspension settings can include setting a spring force to closed or mid, a damping to slow or mid, a rear stroke to long or mid and a front stroke to long or mid. On the other hand, in step S71B, when the riding posture of the rider is determined to be standing, the controller 54 proceeds to step S75 where eighth standing suspension settings are selected. For example, as seen in FIG. 42, the eighth standing suspension settings can include setting a spring force to closed, a damping to strong or mid, a rear stroke to mid or long and a front stroke to mid or long.

In step S71C, when the riding posture of the rider is determined to be sitting, the controller 54 proceeds to step S76 where ninth sitting suspension settings are selected. For example, as seen in FIG. 43, the ninth sitting suspension settings can include setting a spring force to closed or mid, a damping to slow or mid, a rear stroke to short, and a front stroke to long. On the other hand, in step S71C, when the riding posture of the rider is determined to be standing, the controller 54 proceeds to step S77 where ninth standing suspension settings are selected. For example, as seen in FIG. 44, the ninth standing suspension settings can include setting a spring force to closed or mid, a damping to strong or mid, a rear stroke to short and a front stroke to long.

Figure 24:
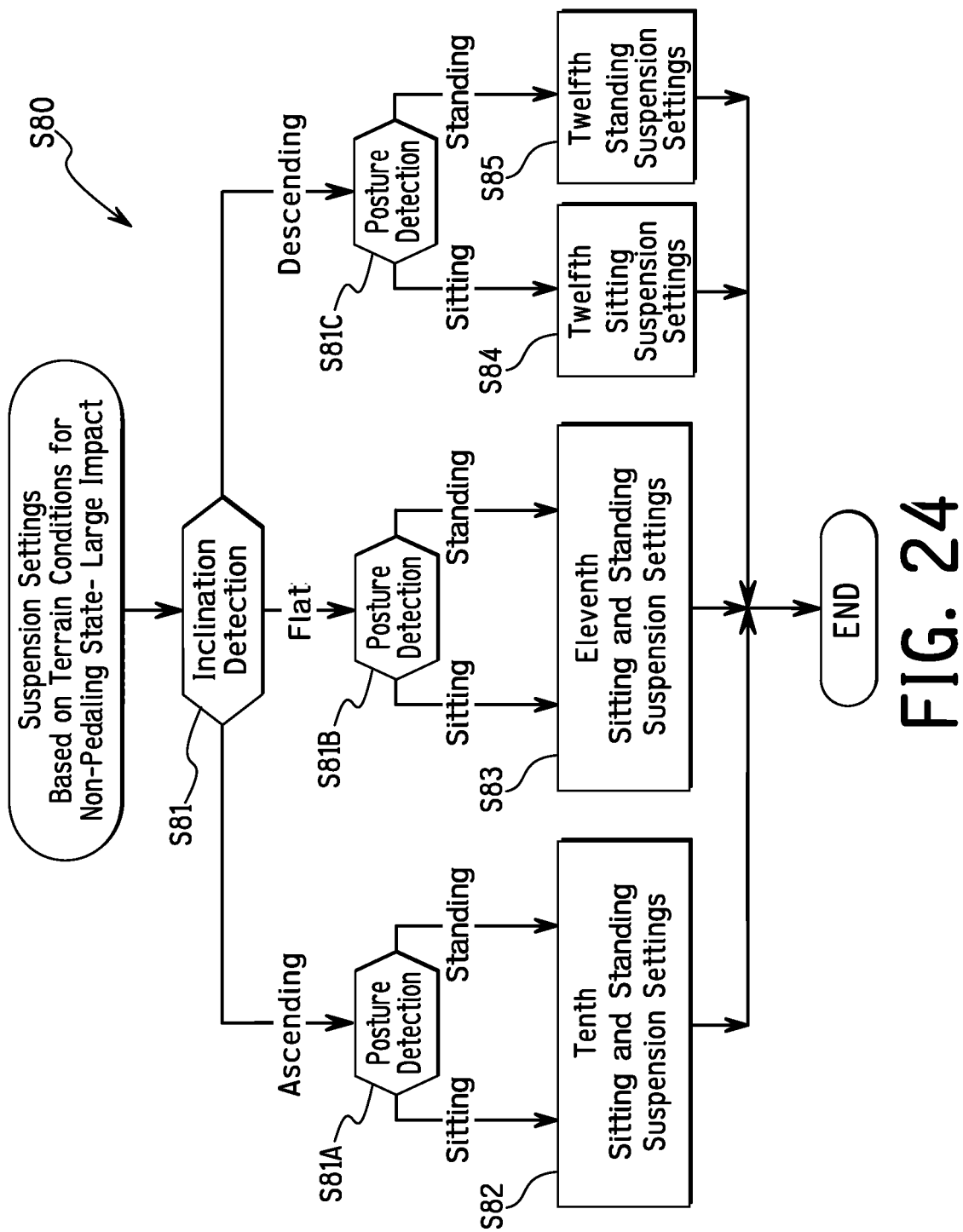
FIG. 24 is a flowchart of a further subroutine of the automatic suspension control of FIG. 20 that is executed by the electronic controller of the suspension control system upon determining a non-pedaling state exists and a large impact is present.
Figure 25:
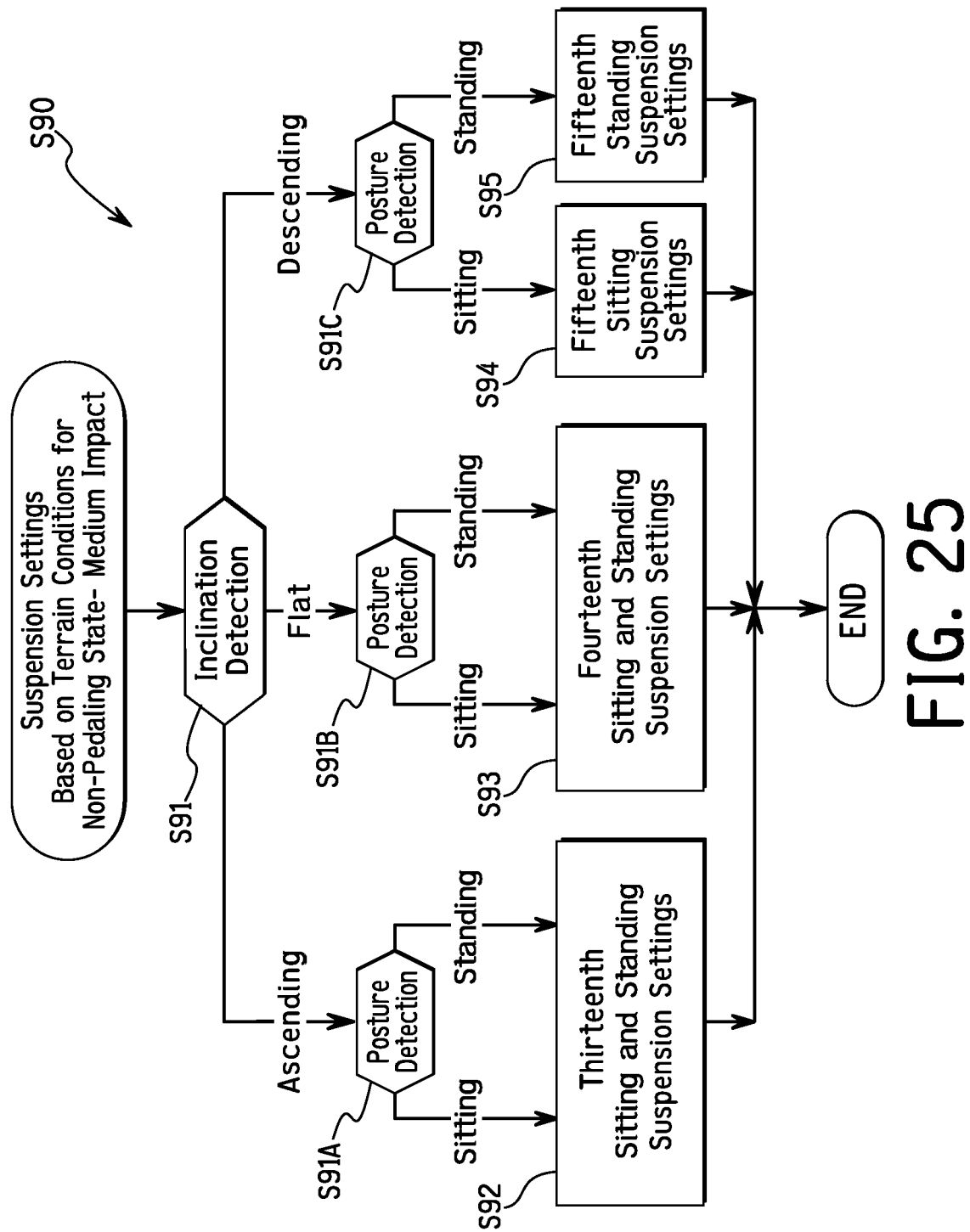
FIG. 25 is a flowchart of a further subroutine of the automatic suspension control of FIG. 20 that is executed by the electronic controller of the suspension control system upon determining a non-pedaling state exists and a medium impact is present.
Figure 26:
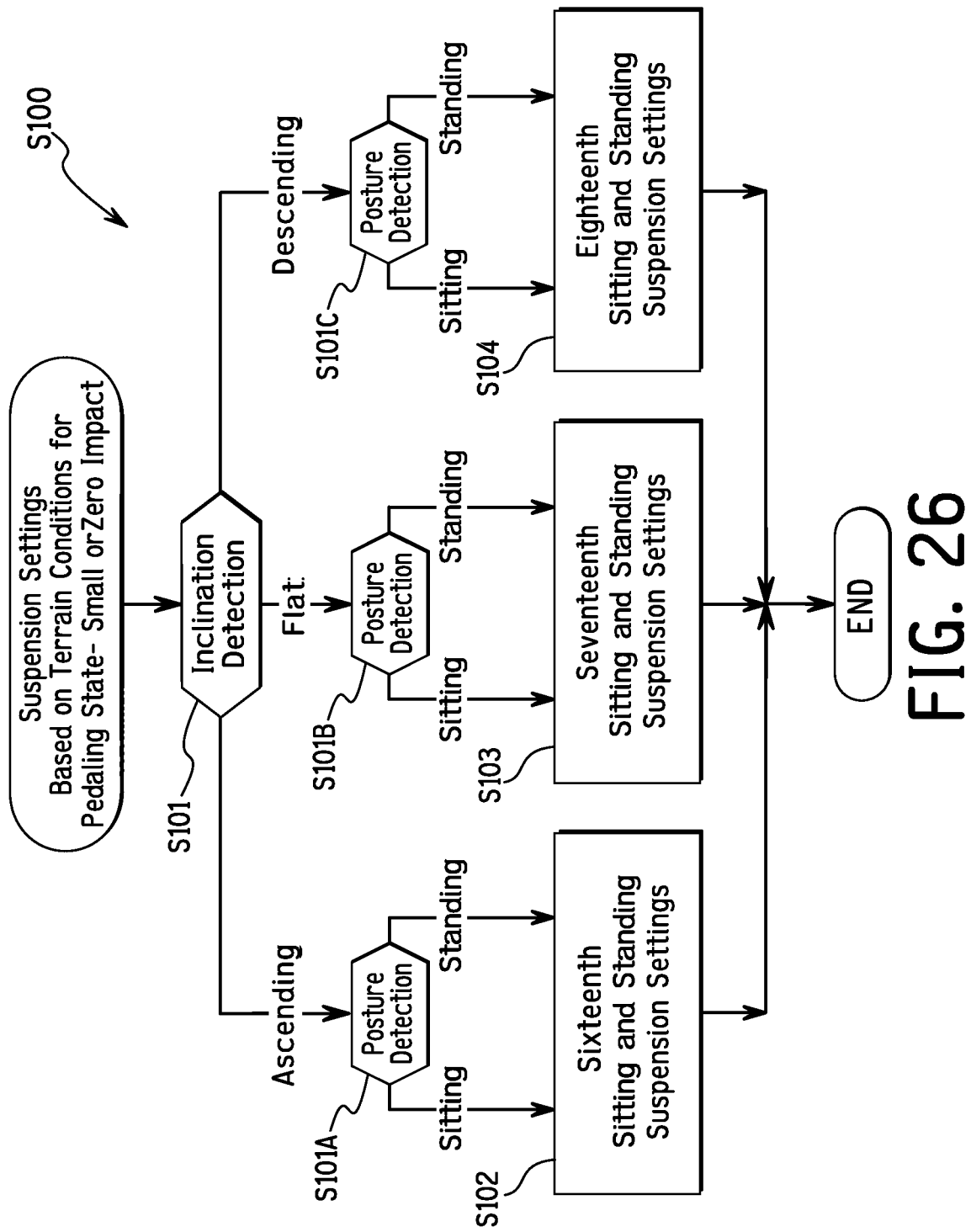
FIG. 26 is a flowchart of a further subroutine of the automatic suspension control of FIG. 20 that is executed by the electronic controller of the suspension control system upon determining a non-pedaling state exists and a small to zero impact is present.

Referring to the suspension control of the subroutine (step S4") of FIG. 20, in step S41, the controller 54 determines an impact (e.g., includes at least traveling surface roughness) of the terrain human-powered vehicle A. The impact detection is based on the detection results of one or more of the detectors 52A to 52H. Once a judgement is made as to the level of the impact of the terrain on the human-powered vehicle A in step S41, the controller 54 then proceeds to one of steps S80, S90 or S100 based on the level of the impact (i.e., at least traveling surface roughness) of the terrain on the human-powered vehicle A. The steps S80, S90 or S100 are subroutines that use traveling surface inclination and riding posture of the rider for determining the suspension settings of the rear shock absorber RS and/or the front fork FF. The subroutine of step S80 is illustrated by the flow chart of FIG. 24. The subroutine of step S90 is illustrated by the flow chart of FIG. 25. The subroutine of step S100 is illustrated by the flow chart of FIG. 26.

In the case where the level of the impact of the terrain on the human-powered vehicle A is determined to be large (FIG. 24), the controller 54 then proceeds to step S81. In step S81, the controller 54 determines traveling surface inclination of the terrain human-powered vehicle A. Once a judgement is made as to the inclination of the human-powered vehicle A in step S81, the controller 54 then proceeds to one of steps S81A, S81B or S81C based on the inclination of the human-powered vehicle A.

In the case where the inclination of the human-powered vehicle A is determined to be ascending, the controller 54 proceeds to steps S81A. In the case where the inclination of the human-powered vehicle A is determined to be flat (level), the controller 54 proceeds to steps S81B. In the case where the inclination of the human-powered vehicle A is determined to be descending, the controller 54 proceeds to steps S81C. In steps S81A, S81B or S81C, the controller 54 determines the riding posture of the rider (sitting or standing). However, this control process can be modified to determine a riding condition which includes both riding posture of the rider and other parameters as needed and/or desired.

In step S81A, when the riding posture of the rider is determined to be sitting or standing, the controller 54 proceeds to step S82 where tenth sitting and standing suspension settings are selected. For example, as seen in FIG. 45, the tenth sitting and standing suspension settings can include setting a spring force to medium, a damping to medium or strong, a rear stroke to long and a front stroke to short or mid. While the suspension settings are the same for sitting and standing when it has been determined that the impact (traveling surface roughness) is large and the inclination is ascending, it will be apparent from this disclosure that the suspension settings for sitting and standing can be different when it has been determined that the impact (traveling surface roughness) is large and the inclination is ascending.

In step S81B, when the riding posture of the rider is determined to be sitting or standing, the controller 54 proceeds to step S83 where eleventh sitting and standing suspension settings are selected. For example, as seen in FIG. 46, the eleventh sitting and standing suspension settings can include setting a spring force to medium, a damping to medium or strong, a rear stroke to long or mid, and a front stroke to long or mid. While the suspension settings are the same for sitting and standing when it has been determined that the impact (traveling surface roughness) is large and the inclination is flat (level), it will be apparent from this disclosure that the suspension settings for sitting and standing can be different when it has been determined that the impact (traveling surface roughness) is large and the inclination is flat (level).

In step S81C, when the riding posture of the rider is determined to be sitting, the controller 54 proceeds to step S84 where twelfth sitting suspension settings are selected. For example, as seen in FIG. 47, the twelfth sitting suspension settings can include setting a spring force to open or mid, a damping to medium, a rear stroke to short or mid, and a front stroke to long. On the other hand, in step S81C, when the riding posture of the rider is determined to be standing, the controller 54 proceeds to step S85 where twelfth standing suspension settings are selected. For example, as seen in FIG. 48, the twelfth standing suspension settings can include setting a spring force to open or mid, a damping to medium or strong, a rear stroke to long or mid, and a front stroke to long.

In the case where the level of the impact of the terrain on the human-powered vehicle A is determined to be medium (FIG. 25), the controller 54 then proceeds to step S91. In step S91, the controller 54 determines traveling surface inclination of the terrain human-powered vehicle A. Once a judgement is made as to the inclination of the human-powered vehicle A in step S91, the controller 54 then proceeds to one of steps S91A, S91B or S91C based on the inclination of the human-powered vehicle A.

In the case where the inclination of the human-powered vehicle A is determined to be ascending, the controller 54 proceeds to steps S91A. In the case where the inclination of the human-powered vehicle A is determined to be flat (level), the controller 54 proceeds to steps S91B. In the case where the inclination of the human-powered vehicle A is determined to be descending, the controller 54 proceeds to steps S91C. In steps S91A, S91B or S91C, the controller 54 determines the riding posture of the rider (sitting or standing). However, this control process can be modified to determine a riding condition which includes both riding posture of the rider and other parameters as needed and/or desired.

In step S91A, when the riding posture of the rider is determined to be sitting or standing, the controller 54 proceeds to step S92 where thirteenth sitting and standing suspension settings are selected. For example, as seen in FIG. 49, the thirteenth sitting and standing suspension settings can include setting a spring force to medium, a damping to medium, a rear stroke to long and a front stroke to short. While the suspension settings are the same for sitting and standing when it has been determined that the impact (traveling surface roughness) is medium and the inclination is ascending, it will be apparent from this disclosure that the suspension settings for sitting and standing can be different when it has been determined that the impact (traveling surface roughness) is medium and the inclination is ascending.

In step S91B, when the riding posture of the rider is determined to be sitting or standing, the controller 54 proceeds to step S93 where fourteenth sitting and standing suspension settings are selected. For example, as seen in FIG. 50, the fourteenth sitting and standing suspension settings can include setting a spring force to medium, a damping to medium, a rear stroke to long or mid and a front stroke to long or mid. While the suspension settings are the same for sitting and standing when it has been determined that the impact (traveling surface roughness) is medium and the inclination is flat (level), it will be apparent from this disclosure that the suspension settings for sitting and standing can be different when it has been determined that the impact (traveling surface roughness) is medium and the inclination is flat (level).

In step S91C, when the riding posture of the rider is determined to be sitting or standing, the controller 54 proceeds to step S94 where fifteenth sitting and standing suspension settings are selected. For example, as seen in FIG. 51, the fifteenth sitting and standing suspension settings can include setting a spring force to medium, a damping to medium, a rear stroke to short, and a front stroke to long. While the suspension settings are the same for sitting and standing when it has been determined that the impact (traveling surface roughness) is medium and the inclination is descending, it will be apparent from this disclosure that the suspension settings for sitting and standing can be different when it has been determined that the impact (traveling surface roughness) is medium and the inclination is descending.

In the case where the level of the impact of the terrain on the human-powered vehicle A is determined to be small to zero (FIG. 26), the controller 54 then proceeds to step S101. In step S101, the controller 54 determines traveling surface inclination of the terrain human-powered vehicle A. Once a judgement is made as to the inclination of the human-powered vehicle A in step S101, the controller 54 then proceeds to one of steps S101A, S101B or S101C based on the inclination of the human-powered vehicle A.

In the case where the inclination of the human-powered vehicle A is determined to be ascending, the controller 54 proceeds to steps S101A. In the case where the inclination of the human-powered vehicle A is determined to be flat (level), the controller 54 proceeds to steps S101B. In the case where the inclination of the human-powered vehicle A is determined to be descending, the controller 54 proceeds to steps S101C. In steps S101A, S101B or S101C, the controller 54 determines the riding posture of the rider (sitting or standing). However, this control process can be modified to determine a riding condition which includes both riding posture of the rider and other parameters as needed and/or desired.

In step S101A, when the riding posture of the rider is determined to be sitting or standing, the controller 54 proceeds to step S102 where sixteenth sitting and standing suspension settings are selected. For example, as seen in FIG. 52, the sixteenth sitting and standing suspension settings can include setting a spring force to closed or mid, a damping to slow or mid, a rear stroke to long and a front stroke to short. While the suspension settings are the same for sitting and standing when it has been determined that the impact (traveling surface roughness) is small to zero and the inclination is ascending, it will be apparent from this disclosure that the suspension settings for sitting and standing can be different when it has been determined that the impact (traveling surface roughness) is small to zero and the inclination is ascending.

In step S101B, when the riding posture of the rider is determined to be sitting or standing, the controller 54 proceeds to step S103 where seventeenth sitting and standing suspension settings are selected. For example, as seen in FIG. 53, the seventeenth sitting and standing suspension settings can include setting a spring force to closed or mid, a damping to slow or mid, a rear stroke to mid or long and a front stroke to mid or long. While the suspension settings are the same for sitting and standing when it has been determined that the impact (traveling surface roughness) is small to zero and the inclination is flat (level), it will be apparent from this disclosure that the suspension settings for sitting and standing can be different when it has been determined that the impact (traveling surface roughness) is small to zero and the inclination is flat (level).

In step S101C, when the riding posture of the rider is determined to be sitting or standing, the controller 54 proceeds to step S104 where eighteenth sitting and standing suspension settings are selected. For example, as seen in FIG. 54, the eighteenth sitting and standing suspension settings can include setting a spring force to closed or mid, a damping to slow or mid, a rear stroke to short, and a front stroke to long. While the suspension settings are the same for sitting and standing when it has been determined that the impact (traveling surface roughness) is small to zero and the inclination is descending, it will be apparent from this disclosure that the suspension settings for sitting and standing can be different when it has been determined that the impact (traveling surface roughness) is small to zero and the inclination is descending.

In understanding the scope of the suspension control system according to the present invention, which is to adjust an operating state of a suspension using detection information relating to a running condition of the human-powered vehicle indirectly indicative of a pedaling state of the human-powered vehicle, the suspension control system is not limited to the embodiments disclosed in the specification. As used herein, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the suspension control system. Accordingly, these directional terms, as utilized to describe the suspension control system should be interpreted relative to a human-powered vehicle in an upright riding position on a horizontal surface and that is equipped with the suspension control system. The terms "left" and "right" are used to indicate the "right" when referencing from the right side as viewed from the rear of the a human-powered vehicle, and the "left" when referencing from the left side as viewed from the rear of the a human-powered vehicle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention (suspension control system), it will be apparent to those skilled in the art from this disclosure that various changes and modifications can be made herein without departing from the scope of the invention as defined in the appended claims. Thus, the suspension control system is not limited to the embodiments disclosed in the specification. Also, the steps of the suspension control system can be omitted and/or shuffled as needed and/or desired. For example, unless specifically stated otherwise, the size, shape, location or orientation of the various components can be changed as needed and/or desired so long as the changes do not substantially affect their intended function. Also, for example, the parameters and values for setting an operating state of a suspension can be set by default or selected by a rider's preferences. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A suspension control system for a suspension of a human-powered vehicle, the suspension control system comprising: a detector configured to detect information relating to a running condition of the human-powered vehicle indirectly indicative of a pedaling state of the human-powered vehicle; and an electronic controller configured to output a control signal to adjust an operating state of the suspension in accordance with the information detected by the detector, the control signal including at least a first suspension control signal to set the suspension to a first operating state, and a second suspension control signal to set the suspension to a second operating state different from the first operating state, and the electronic controller being configured to output at least one of the first suspension control signal and the second suspension control signal to adjust the operating state of the suspension, wherein the control signal further includes a third suspension control signal to set the suspension to a third operating state different from the first operating state and the second operating state, the electronic controller being further configured to output the third suspension control signal to adjust the operating state of the suspension, wherein the operating state of the suspension includes at least one of a suspension stroke, a spring preload, and a lockout.

2. A suspension control system for a suspension of a human-powered vehicle, the suspension control system comprising: a fluctuation detector configured to detect information relating to a fluctuation in a running condition of the human-powered vehicle in a predetermined time interval, wherein the fluctuation includes at least one of a tire air pressure, a vehicle acceleration, a handlebar load, an assist power output, a chain state change, and a precise speed; and an electronic controller configured to output a control signal to adjust an operating state of the suspension in accordance with the information detected by the fluctuation detector, the control signal including at least a first suspension control signal to set the suspension to a first operating state, a second suspension control signal to set the suspension to a second operating state different from the first operating state, the electronic controller being further configured to output at least one of the first suspension control signal and the second suspension control signal to adjust the operating state of the suspension.

3. The suspension control system according to claim 2, further comprising
   a detector configured to detect information relating to the running condition of the human-powered vehicle indirectly indicative of a pedaling state of the human-powered vehicle,
   the electronic controller being further configured to output the control signal to adjust the operating state of the suspension in accordance with the information detected by the detector.

4. The suspension control system according to claim 2, wherein
   the control signal further includes a third suspension control signal to set the suspension to a third operating state different from the first operating state and the second operating state,
   the electronic controller being, further configured to output the third suspension control signal to adjust the operating state of the suspension.

5. The suspension control system according to claim 4, wherein
the operating state of the suspension relates to at least one of a suspension stroke, a spring preload, damping and a lockout.

6. The suspension control system according to claim 2, further comprising
an additional detector configured to detect additional information relating to at least one of a riding posture of rider riding the human-powered vehicle and a terrain condition, and
the electronic controller is configured to output the control signal to adjust the operating state of the suspension in accordance with the information in combination with the additional information.

7. The suspension control system according to claim 6, wherein
the riding posture includes at least one of a sitting posture and a standing posture.

8. The suspension control system according to claim 6, wherein
the electronic controller is configured to adjust a damping value in accordance with the additional information relating to the terrain condition.

9. The suspension control system according to claim 2, wherein
the control signal includes at least one of a front suspension adjustment signal and a rear suspension adjustment signal.

10. A bicycle comprising the suspension control system according to claim 2, the bicycle further comprising:
a bicycle frame;
a front wheel coupled to the bicycle frame;
a rear wheel coupled to the bicycle frame; and
at least one of a front suspension provided between the bicycle frame and the front wheel and a rear suspension provided between the bicycle frame and the rear wheel.

11. The suspension control system according to claim 1, further comprising
an additional detector configured to detect additional information relating to at least one of a riding posture of rider riding the human-powered vehicle and a terrain condition, and
the electronic controller is configured to output the control signal to adjust the operating state of the suspension in accordance with the information in combination with the additional information.

12. The suspension control system according to claim 11, wherein
the riding posture includes at least one of a sitting posture and a standing posture.

13. The suspension control system according to claim 11, wherein
the electronic controller is configured to adjust a damping value in accordance with the additional information relating to the terrain condition.

14. The suspension control system according to claim 1, wherein
the control signal includes at least one of a front suspension adjustment signal and a rear suspension adjustment signal.

15. A bicycle comprising the suspension control system according to claim 1, the bicycle further comprising:
a bicycle frame;
a front wheel coupled to the bicycle frame;
a rear wheel coupled to the bicycle frame; and
at least one of a front suspension provided between the bicycle frame and the front wheel and a rear suspension provided between the bicycle frame and the rear wheel.

* * * * *